US012754028B2

(12) United States Patent
Crabtree et al.

(10) Patent No.: US 12,754,028 B2
(45) Date of Patent: Oct. 6, 2026

(54) MOBILE ENERGY AND DATA PLANNING AND OPTIMIZATION

(71) Applicant: QOMPLX LLC, Reston, VA (US)

(72) Inventors: Jason Crabtree, Vienna, VA (US); Richard Kelley, Woodbridge, VA (US); Jason Hopper, Halifax (CA); David Park, Fairfax, VA (US)

(73) Assignee: QOMPLX LLC, Reston, VA (US)

( * ) Notice: Subject to any disclaimer, the term of this patent is extended or adjusted under 35 U.S.C. 154(b) by 90 days.

(21) Appl. No.: 18/679,439

(22) Filed: May 30, 2024

(65) Prior Publication Data

US 2025/0369764 A1 Dec. 4, 2025

(51) Int. Cl.
*G01C 21/36* (2006.01)
*G01C 21/34* (2006.01)

(52) U.S. Cl.
CPC ..... *G01C 21/3484* (2013.01); *G01C 21/3446* (2013.01); *G01C 21/3469* (2013.01); *G01C 21/3614* (2013.01)

(58) Field of Classification Search
CPC ............ G01C 21/3484; G01C 21/3446; G01C 21/3469; G01C 21/3614
See application file for complete search history.

(56) References Cited

U.S. PATENT DOCUMENTS

2023/0354228 A1* 11/2023 Kim .................. H04W 56/0015
2023/0385624 A1* 11/2023 Vrudhula ............. G06N 3/0464
2024/0395125 A1* 11/2024 Cheng .................. G08B 21/043

* cited by examiner

*Primary Examiner* — Scott A Browne
*Assistant Examiner* — Terry C Buse
(74) *Attorney, Agent, or Firm* — NK Patent Law

(57) ABSTRACT

A system and method for artificial intelligence enhanced mobile energy and data and network control, planning and optimization. The present invention relates to a system and method for optimizing energy and data and network use in mobile platforms, such as facilities, vehicles, tools, and devices. The system leverages AI, data analytics, and context-aware techniques to collect, process, and analyze data from various sources, including sensors, weather data, and spatial and temporal data with locality aware computing, transport, storage and networking across assets that may be owned or operated by multiple stakeholders. By considering a variety of factors, the system generates optimized recommendations for data storage, compute, transmission, device settings, fleet management, and physical and virtual route planning and logic locality planning. The invention offers benefits, including improved energy efficiency, enhanced data and network management, increased operational efficiency, and cost savings.

24 Claims, 13 Drawing Sheets

MOBILE ENERGY AND DATA PLANNING AND OPTIMIZATION

CROSS-REFERENCE TO RELATED APPLICATIONS

Priority is claimed in the application data sheet to the following patents or patent applications, each of which is expressly incorporated herein by reference in its entirety:

None.

BACKGROUND OF THE INVENTION

Field of the Art

The disclosure relates to the field of data and energy, and more particularly to the fields of data and energy collection, distribution, utilization, and optimization.

Discussion of the State of the Art

In recent years, there has been a significant increase in the use of mobile platforms, such as vehicles, robotics, tools, and devices, across various industries and sectors. These platforms have become increasingly energy and data intensive, posing challenges in operating efficiently and effectively. Rapid improvements in batteries and energy efficiency in computation have enabled significant progress, but increased dependence on such devices has led to several challenges data management complexities, challenges with energy procurement and apportionment (including charging scheduling and coordination) and operational inefficiencies when distribution/transport, storage, compute or energy resources are not coordinated for an increasingly just-in-time, just-in-place, just-in-context world.

One of the primary challenges faced by modern mobile platforms is the need to optimize energy and data usage under multiple operating scenarios. As these platforms become more advanced and feature-rich, their energy and data requirements have grown substantially and are intertwined. Existing solutions for managing energy, bandwidth, data transport, storage and compute usage in mobile platforms often rely on manual interventions or basic automation techniques, which are not sufficient to address the complex and dynamic nature of these systems which are highly interrelated in practice.

Another significant challenge is the management and transmission of data generated by mobile platforms with at least intermittent network connectivity or data exchange, or with variable cost data transmission. With the proliferation of Internet of Things (IoT) sensors and network connected devices, the variety, volume, velocity and value of data generated has increased exponentially while also suffering from potential challenges to veracity. Data of interest needs to be collected, processed, and transmitted efficiently to enable real-time decision-making and optimization. However, traditional data management approaches often struggle to cope with the scale, diversity, and velocity of data generated by mobile platforms. Similarly, current approaches largely focus on either local (e.g., on device) or cloud-based computation and storage but lack elegant coordination capabilities to make intelligent assessments as to the optimal locality of computational tasks, which may change over time, especially when fleets of devices are considered with similar operational challenges (e.g., in robotics) or where intermediate compute locations on networking equipment, content delivery networks, or site or regional/national infrastructure is available (even if only under certain conditions).

Moreover, mobile platforms often operate in dynamic and unpredictable environments, where external factors such as weather conditions, geographic location, and network type or cost or availability can significantly impact their performance or ultimate economics. Existing solutions often fail to consider these context-specific factors, leading to suboptimal decision-making and reduced efficiency compared to the potential. The efficiency gaps are becoming increasingly important to solve given increases in data density, data intensive compute tasks, and the broad range of available hardware.

To address these challenges, there is a growing need for advanced systems and methods that can optimize energy, transport, storage, and compute and network use in mobile platforms involving data and especially when operating in both tethered and untethered states-meaning not connected to the electric grid or Internet and therefore requiring periodic charging, fueling, or equivalent on a periodic basis. Also, some of the same challenges manifest for even grid connected electrically powered systems or natural gas/pipeline powered systems when operational resilience considerations are taken into place and probabilistic operational impacts from energy system outages are included in operational planning and optimization strategies. These solutions should leverage the latest advancements in artificial intelligence, data analytics, simulation modeling, and context-aware computing to enable real-time planning, optimization and decision-making.

However, existing solutions often focus on narrowly defined specific aspects of energy or data management and do not provide a comprehensive and integrated approach that considers the complex interplay between energy, data, and context-specific factors—or the dependent business systems, processes or financial flows resulting from their operational activities. Moreover, current systems often rely on rule-based approaches or simplistic machine learning or state machine systems, which may not be sufficient to deal with the dynamic and unpredictable nature of mobile platforms when considering system level dynamics which can introduce more complexity and also may have characteristics like reflexivity in many real-world scenarios.

Therefore, there is a clear need for a novel and innovative system that can optimize energy and data use in mobile platforms by leveraging advanced AI techniques, context-aware computing, and real-time data analytics. Such a system should be able to adapt to the specific requirements and constraints of different mobile platforms, while also considering external factors such as weather conditions, geographic location, computer/transport/storage costs, network type and availability and cost considerations that may aid the system in migrating data or computational tasks to or from mobile or edge devices to cloud or data center resources (which may be provided by different vendors with different costs and performance service level agreements).

What is needed is a system and method for mobile energy and data planning and optimization which addresses these challenges by providing a comprehensive and integrated solution for optimizing energy and data use in mobile platforms. By leveraging the latest advancements in AI, data analytics, and context-aware computing, the invention enables real-time optimization and decision-making, leading to improved efficiency, reduced costs, and enhanced performance. The invention represents a significant step forward in the field of mobile platform optimization and has the potential to revolutionize the way energy and data are managed in these systems.

SUMMARY OF THE INVENTION

Accordingly, the inventor has conceived and reduced to practice a system and method for mobile energy and data planning and optimization across a diverse range of operating scenarios. The invention is a comprehensive system and method for optimizing energy and data use in mobile platforms, such as vehicles, tools, and devices operating on Earth, the cislunar economic sphere, in broader space, or other planets, under changing circumstances to address both everyday concerns as well as tail risks. It leverages artificial intelligence, data analytics, and context-aware techniques to collect, process, and analyze data from various sources, including IoT sensors, LiDAR, laser metrology information, spectrographs, cameras, photogrammetry cameras, positional data, acoustic, electromagnetic, servo data and other forms of positional information, computing system operational and administrative and error codes, specialty system data and logging (e.g., CAN or SCADA or DNP3 or Modbus), barometric data, temperature data, other weather data, chemical data, light data, and geospatial data and can consider the knowledge and data available to the system in previous system states. The system generates optimized recommendations for data storage, data transmission, compute task locality and timing, device settings, and route or action planning based on factors like network availability, data priority, and energy efficiency and device operational goals, retaining awareness of prior information available in discrete decision-evaluations or planning cycles when training, retraining, finetuning, or stress testing model, data, or simulation parameters, selection processes or optimization processes. It also introduces local data storage capabilities, enabling devices to store data locally when immediate transmission is not optimal. The modular architecture allows for easy integration with existing mobile platforms and scalability for future growth. The invention offers benefits such as improved task completion rates, improved task completion times, energy efficiency, enhanced data management, increased operational efficiency over a broader range of potential future operating environments, and ultimately cost savings or superior earnings potential, with wide-ranging applications in transportation, manufacturing, logistics, space, health care and mobile device sectors.

According to a preferred embodiment, a system for mobile energy and data planning and optimization, comprising: a computing device comprising at least a memory and a processor; a plurality of programming instructions stored in the memory and operable on the processor, wherein the first plurality of programming instructions, when operating on the processor, cause the computing device to: collect a plurality of data from a plurality of sensors or systems wherein data may include weather, geospatial, energy, performance metrics and traces, observability data, sensor data, and system states; train an artificial intelligence and planning system using the plurality of data on how to maximize the efficiency of the data and energy and network being used or generated by a device or vehicle; produce a plurality of recommendations using the artificial intelligence system wherein the plurality of recommendations allow the device or vehicle to more efficiently utilize and process data and energy; and modify a current state of the device or vehicle into a more efficient state by implementing the plurality of recommendations generated by the artificial intelligence system, is disclosed.

According to another preferred embodiment, a method for mobile energy and data planning and optimization, comprising the steps of: collecting a plurality of data from a plurality of sensors or systems wherein data may include weather, geospatial, energy, performance metrics and traces, observability data, sensor data, and system states; training an artificial intelligence and planning system using the plurality of data on how to maximize the efficiency of the data and energy and network being used or generated by a device or vehicle; producing a plurality of recommendations using the artificial intelligence system wherein the plurality of recommendations allow the device or vehicle to more efficiently utilize and process data and energy; and modifying a current state of the device or vehicle into a more efficient state by implementing the plurality of recommendations generated by the artificial intelligence system, is disclosed.

According to an aspect of an embodiment, the plurality of recommendations are broadcast to a user interface where a user can make elections as to which recommendations to implement.

According to an aspect of an embodiment, the plurality of data includes data gathered by integrated sensors within the device or vehicle.

According to an aspect of an embodiment, the plurality of data is preprocessed by an edge computer which is integrated into the device or vehicle before being sent to peer devices, edge devices, content delivery networks or central cloud system resources.

According to an aspect of an embodiment, the plurality of data is populated into a knowledge vector graph or vector graph or combination thereof.

According to an aspect of an embodiment, a user may pose an inquiry to the system through a user interface and a response is generated by processing their inquiry through the knowledge vector graph and the artificial intelligence system.

BRIEF DESCRIPTION OF THE DRAWING FIGURES

DETAILED DESCRIPTION OF THE INVENTION

Figure 1:
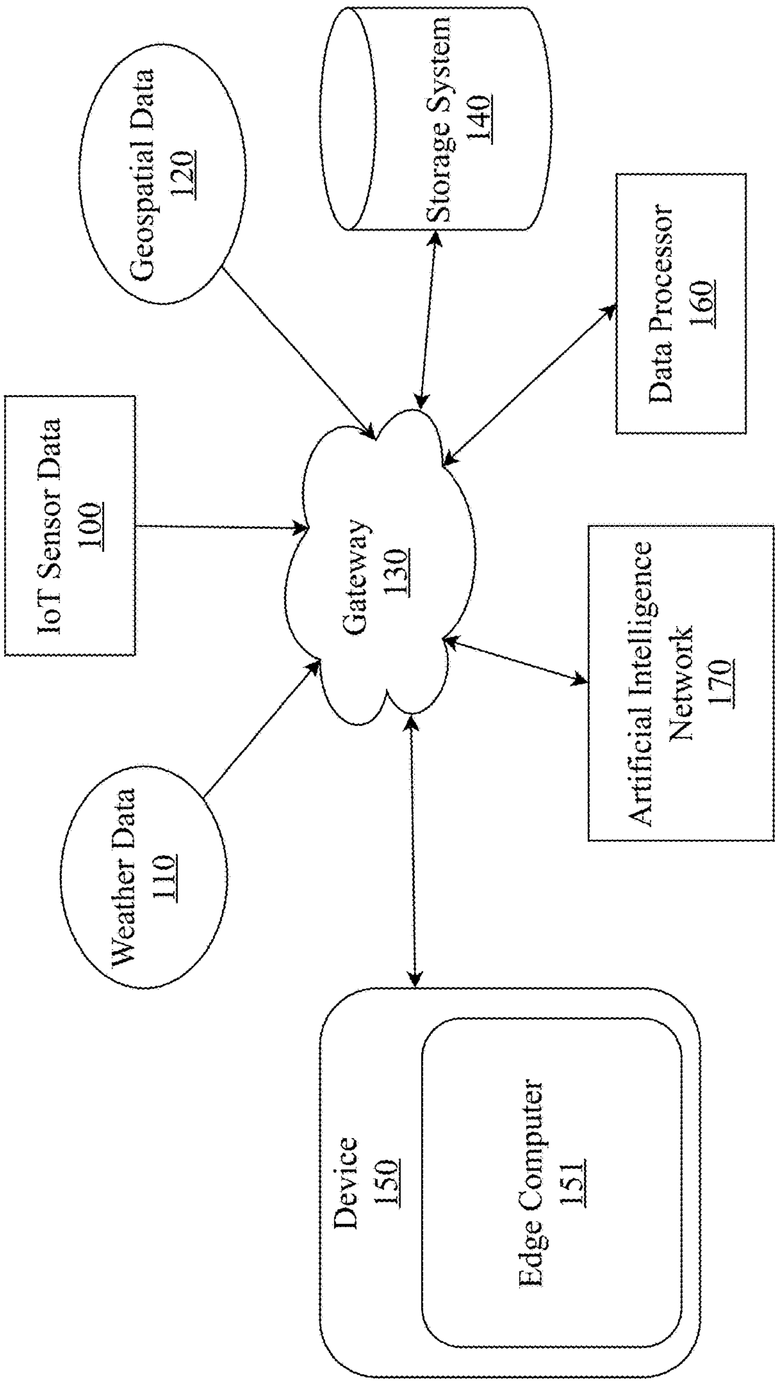
FIG. 1 is a block diagram illustrating an exemplary system architecture for mobile energy and data planning and optimization.

The inventor has conceived, and reduced to practice, a system and method for artificial intelligence enhanced mobile energy and data and network control, planning and optimization. The present invention relates to a system and method for optimizing energy and data and network use in mobile platforms, such as facilities, vehicles, tools, and devices. The system leverages AI, data analytics, and context-aware techniques to collect, process, and analyze data from various sources, including sensors, weather data, and spatial and temporal data with locality aware computing, transport, storage and networking across assets that may be owned or operated by multiple stakeholders. By considering a variety of factors, the system generates optimized recommendations for data storage, compute, transmission, device settings, fleet management, and physical and virtual route planning and logic locality planning. The invention offers benefits, including improved energy efficiency, enhanced data and network management, increased operational efficiency, and cost savings.

According to an embodiment, the system may also modify its objectives or objective functions for the local device to improve the performance of other on-board logic in pursuing its aims for a finite time horizon and these objective lists, corresponding objective functions, and associated plans may be stored, versioned and modified in concert with supervisory processes.

According to an embodiment, coordinating cloud resources may keep track of logic locality and potential logic locality based on distributed computational graph-based (DCG) representations of dependencies for computing tasks and propose viable data and logic "switches" from device to an edge or cloud resource on a temporary or permanent basis based on things like global internet status (e.g., mutually agreed norms for routing security data, DNS root servers), company network, mobile networks or satellite orbits and coverage for primary, alternate, contingent or emergency (PACE) communications. The system may be configured to consider the availability of different communication channels and computing resources in the context of the device's state and the computational tasks it needs to perform. This ensures that the system can maintain resilience and failover capabilities when one of the primary dependencies in the DCG is unavailable. In some embodiments, an optimization routine takes into account not only the DCG of interest but also the PACE-enabled DCGs. This means that the system can adapt to situations where the availability of communications or computing resources is degraded, ensuring that critical tasks can still be executed. The same PACE principles can be applied to optimize the charging and energy capture processes for devices in the network. When communication or computing availability is limited, the system may adopt a more conservative approach to energy management. For example, in the case of a self-driving car, if the vehicle loses network connectivity and can't validate the presence or availability of a future fuel source, it may decide to refuel or recharge immediately to ensure that it can continue operating safely. Similarly, the same vehicle may determine that its sensor functions are degraded and ask the driver to re-engage (i.e., disable self-driving) to remain compliant with regulatory, insurance or other objective function requirements, either declared or inferred.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for mobile energy and data planning and optimization. The system may comprise a plurality of components that work together to collect, process, and analyze data from various sources to generate optimized energy and data and computer and network usage recommendations for mobile platforms. The system includes Internet of Things (IoT) sensors 100 installed on mobile platforms to collect real-time data related to energy consumption, device performance, and environmental factors. These sensors transmit the collected data to a gateway 130 for further processing. In addition to IoT sensor data, the system may incorporate weather data 110 and geospatial data 120. Weather data includes information about current and forecasted weather conditions, such as temperature, humidity, precipitation, cloud, downwelling radiation, and wind speed. Geospatial data comprises information about the geographic location of mobile platforms, including latitude, longitude, elevation, and terrain features. For mobile platforms located in space this may include orbital position and attitude data, as well as data on other orbital crafts and debris. The system may also incorporate space weather data, which may include information about solar activity, such as solar flares, coronal mass ejections (CMEs), and geomagnetic storms. These events can have significant impacts on Earth's magnetic field and ionosphere, affecting computing performance or results, satellite communications, GPS accuracy, and power grid stability or quality, or cause damage to physical infrastructure. Similarly, man-made devices like electromagnetic pulses (EMPs) or cyber-attacks may also be considered.

In addition to weather and geospatial data, the system may also incorporate optional amenity or place data 125. This data includes information about nearby amenities, such as charging stations, rest stops, restaurants, places of business, points of interest and accommodations. Place data may also include details about specific locations, such as elevation, terrain, popularity, public ratings, and points of interest including those that might be ephemeral (e.g., whale sightings or fall colors or cherry blossoms). By integrating amenity and place data, the system can better optimize energy and data usage recommendations, taking into account the availability of resources and the characteristics of the surrounding environment. Since the system may include both experienced historical events (e.g., extreme weather or fires or earthquakes) and current environmental and economic conditions it can aid users or AI agents or optimization processes in evaluating uncertainty or potential deviations from historical observations, ratings, or experience catalogs available.

In some embodiments, the AI system may also process and analyze internal sensor data within the mobile platform in addition to the external data sources as the internal mobile data would help to analyze applications, processes, and/or behaviors for optimization. In some embodiments, the AI system may collect performance metrics and traces, observability data, and system state information from onboard (or external) sensors and systems.

In one embodiment, the system may be configured to identify severe weather events and adjust future actions to avoid the event. In addition to collecting weather data, the system may collect local weather alerts indicating severe events. Local weather alerts may include but are not limited to tornado watches and warnings, flood warnings, and severe storm warnings including tropical storms and hurricanes. The system may also be able to process alerts about wildfires, landslides, extreme precipitation, windstorms, and blizzards or avalanches. Additionally, the AI system 170 may include a machine learning subsystem which can be configured to process weather data and make accurate predictions about when and where severe events may occur. This may use canonical weather models like those from NOAA or the ECMWF models with or without ML enhancement or tuning, or may look at statistical or ML based approaches. Using predictions made by the machine learning subsystem, the planning and optimization system may adjust specific device state or configuration or make recommendations or alter future plans or objective functions to either route around severe weather systems, or modify energy and data usage to maximize efficiency in the context of a severe weather system or other environmental calamity or stressor (or man-made equivalents since anthropogenic hazards are continuing to rise in both frequency and severity).

In another embodiment, the AI system may be configured to predict cloud fraction and downwelling radiation levels to optimize solar charging for mobile platforms equipped with solar panels. Similar approaches for wind or tidal kinds of resources which must grapple with both variable and uncertain elements may also be handled. The machine learning subsystem within the AI enabled network of at least one device 170 can process ongoing telematics and weather data, including satellite imagery and historical solar irradiance data, to forecast cloud cover, barometric pressure, precipitation, and solar radiation intensity and variance at various locations. By predicting areas and times with optimal solar charging conditions, the system can recommend route diversions, scheduling adjustments, or other actions to maximize the efficiency of renewable energy harvesting based on the harvesting or recovery equipment available to a given device or network of devices. For example, if the AI system predicts that a mobile platform's planned route will encounter significant cloud cover, it may suggest an alternative route that takes advantage of clearer skies and higher downwelling radiation levels or identify various recharging or resupply waypoints. This optimization can extend the operational range and reduce the reliance on grid-based charging for mobile platforms.

Furthermore, the AI system may integrate solar weather forecasting to anticipate and mitigate the potential impacts of severe solar events on mobile platforms. The machine learning subsystem within the AI system 170 can analyze data from space weather monitoring satellites and ground-based observatories to predict the likelihood and intensity of solar flares, CMEs, and geomagnetic storms. By forecasting these events, the system can recommend proactive measures to protect mobile platforms from compute errors, network disruptions, and power fluctuations. For example, if a significant solar event like a Carrington-level solar flare is predicted, the AI system may advise mobile platforms to temporarily switch to more robust communication protocols, activate error correction mechanisms, and prioritize essential functions to maintain operability. In extreme cases, especially those in locations not protected by an atmosphere such as in space or on the lunar surface, the system might even suggest temporarily halting operations or seeking shelter to prevent damage to sensitive electronic components and humans. Similarly, in areas of geopolitical stability the system may recommend increased consideration of EMP resilience or response capabilities for elegant system or process degradation.

The gateway 130 receives data from the IoT sensors, weather data sources, and geospatial data sources, and performs initial data processing, such as data filtering, normalization, and aggregation. The preprocessed data is then sent to a storage system 140. In some embodiments, the preprocessed data may be sent directly to an Artificial Intelligence (AI) network 170 after processing. The system also includes edge computing capabilities, represented by the edge computer 151, or a hybrid computing approach between an edge computer, the mobile platform, or a cloud resource. The edge computer may be located in close proximity to the mobile platforms and performs localized data processing and analysis to enable real-time decision-making and optimization. The edge computer communicates with the devices 150 on the mobile platforms to collect additional data and transmit optimized control commands. Edge computers and devices 150 can also communicate directly with each other, enabling them to share real-time telemetry data and collaborate on decision-making processes. This peer-to-peer communication allows for the creation of a decentralized network of devices that can provide ground truth data for predictive modeling and serve as corrective data for previously run models. By leveraging the collective intelligence of the device network, the system can improve the accuracy and reliability of its predictions and optimizations.

Moreover, this decentralized communication enables the system to assess data and compute locality, allowing for "gossip" within similar resource groups. Devices can share information directly, via a coordinating edge device, or through a cloud resource, depending on the specific requirements and constraints of the application. This approach enhances the system's ability to detect and isolate anomalies, such as sensor malfunctions, by comparing data from multiple devices that traverse the same location. For example, if ten robots or machines pass through the same area and one of them records a significantly different environmental characteristic, such as temperature or humidity, the system can combine this information with data from other devices to determine whether there is a hardware or software issue. The AI system 170 can then incorporate this information into its planning and optimization processes. By considering sensor malfunctions and other operational issues, the system can optimize the timing of charging and maintenance tasks to minimize downtime and ensure the smooth operation of the mobile platform fleet. This holistic approach to data collection, analysis, and decision-making enables the system to adapt to real-world conditions and provide robust, reliable performance in the face of unexpected challenges.

The data processor 160 may perform advanced data analytics and machine learning tasks. It may retrieve data from the storage system 140 or retrieve data directly from the gateway 130 and apply various algorithms to identify patterns, correlations, and anomalies in the data. The data processor also incorporates weather data and geospatial data to generate context-aware insights and recommendations.

The AI system 170 uses the processed data from the data processor (160) to train and refine its models continuously. It employs techniques such as but not limited to deep learning, reinforcement learning, and federated learning to improve the accuracy and efficiency of the optimization algorithms. The AI system 170 may generate optimized energy and data usage recommendations for mobile platforms based on the analysis of IoT terrestrial and non-terrestrial sensor data, weather data, geospatial data, and other relevant factors. These recommendations may include but are not limited to: optimizing data transmission schedules based on network availability, data priority, and cost considerations, adjusting device settings, such as display brightness, battery management, and background processes, based on user context and energy efficiency goals, recommending optimal routes and travel schedules based on weather conditions, energy consumption, and charging infrastructure availability, providing predictive maintenance insights to minimize downtime and optimize energy usage, and action planning. With respect to action planning, for example, consider that a construction bot might need to move and carry something, a lawn bot might turn on its mower or not, a manufacturing bot might have 7 axis arm movement with an eighth axis for linear movement on a rail and need to coordinate lifting, welding, machining, etc. tasks including tool changes. The AI system 170 generates optimized energy, data usage, and action recommendations for mobile platforms based on the analysis of IoT sensor data, weather data, geospatial data, amenity and place data, and other relevant factors. In an implementation, AI system 170 generates optimized energy and data usage recommendations for mobile platforms based on the analysis of IoT sensor data, weather data (including cloud fraction, downwelling radiation predictions, and space weather forecasts), geospatial data, and other relevant factors.

In one embodiment, the AI system 170 may comprise a central server and multiple client nodes. The client nodes may be individual mobile platforms (e.g., vehicles, tools, or devices) or edge computing devices that process data from multiple platforms. Each client node may have its own local machine learning model that is trained on the data collected by the sensors and systems of the associated mobile platform(s).

The AI system 170 utilizes federated learning to enable collaborative model training across client nodes, edge devices, and/or aggregating cloud services without requiring the exchange of raw data. This approach allows for learning locality, where the choice of training or fine-tuning location is based on practical, system, economic, and legal/privacy requirements. The following embodiments and their combinations are possible:

Client Node-based Learning: In this embodiment, each client node (e.g., individual mobile platforms) trains its local model using its own data and then sends only the model updates (e.g., gradient information) to the central server. The central server aggregates the updates from all the client nodes and uses them to improve a global model. The updated global model is then sent back to the client nodes, which use it to refine their local models. This process is repeated iteratively, allowing the AI system to learn from a diverse range of data sources while preserving data privacy.

Edge Device-based Learning: In this embodiment, edge devices (e.g., edge computers or gateways) collect data from multiple mobile platforms and perform localized model training. The edge devices then send the model updates to the central server for aggregation and global model improvement. This approach reduces the communication overhead between client nodes and the central server, and enables faster, more efficient learning by leveraging the processing power of edge devices.

Cloud-based Learning: In this embodiment, the central server (located in the cloud) receives preprocessed data from client nodes or edge devices and performs model training on the aggregated data. The updated global model is then distributed back to the client nodes or edge devices for local adaptation and inference. This approach allows for the utilization of powerful cloud computing resources and enables the training of more complex models on larger datasets.

Combinations of these embodiments are also possible, depending on the specific requirements and constraints of the application. For example, a hybrid approach could involve client nodes performing local training and sending model updates to edge devices, which then aggregate the updates and send them to the cloud for global model improvement. Alternatively, client nodes could send preprocessed data to edge devices for initial training, and then the edge devices could send model updates to the cloud for further refinement.

The choice of learning locality depends on various factors, such as the available computing resources, communication bandwidth, data privacy regulations, and the desired balance between model performance and training efficiency. By leveraging federated learning and the appropriate combination of client nodes, edge devices, and cloud services, the AI system can optimize its learning process while complying with practical, system, economic, and legal/privacy requirements.

Federated learning can be applied at both the device level and the system level in the AI system. At the device level, individual mobile platforms can participate in the federated learning process, contributing their local model updates to improve the global model. At the system level, different organizations or entities (e.g., fleet operators, manufacturers, or service providers) can collaborate through federated learning to create a more comprehensive and robust optimization system.

In addition to federated learning, the AI system may also incorporate transfer learning to further enhance its performance and adaptability under multiple practical implementation/operational, economic, and legal/regulatory constraints. Transfer learning allows the AI-enabled network to leverage knowledge gained from solving one classification, inference or optimization problem and apply it to a different but related problem. For example, the machine learning models trained on one type of mobile platform can be adapted and applied to other similar platforms, reducing the need for extensive training data and accelerating the deployment of the optimization system. For example, large and complex models such as Large Language Models may be centralized but also have one or more trained expert submodels extracted out and transported to edge devices. These expert models may be small enough for mobile hardware but still retain required domain expertise relevant to the specific device.

Transfer learning can be utilized at both the device level and the system level in the AI system. At the device level, the knowledge gained from optimizing one type of mobile platform can be transferred to other platforms of the same or similar type. At the system level, the insights and best practices learned from optimizing energy and data use in one industry or application domain can be adapted and applied to other related domains.

The optimized recommendations may be transmitted back to the devices 150 on the mobile platforms via the gateway 130. The devices may then implement the recommendations autonomously or present them to users for manual intervention.

In one embodiment, the system may utilize adaptive controls that are generated by the AI system 170 to dynamically adjust device settings based on the user's context, location, and anticipated needs. The AI system 170 may leverage the data collected from various sources, including IoT sensors, weather data, geospatial data, and user preferences, to create a comprehensive understanding of the user's current situation and future requirements. By analyzing this data in real-time, the AI system 170 may generate intelligent, context-aware recommendations for adjusting device settings to optimize energy and data usage.

For example, when the user is at a location like Disney World and has an upcoming reservation at a restaurant with embedded in-table charging for phones, the AI system 170 may recommend maintaining full device functionality and connectivity. In this scenario, the user is likely to value uninterrupted access to their device for tasks such as mobile payments, digital tickets, and communication with family members. The AI system 170 may recognize the availability of charging infrastructure at the upcoming location and determines that energy conservation is not a primary concern.

On the other hand, when the user is engaged in an activity like hiking, the AI system 170 may recommend the automatic suspension of non-essential background tasks and the activation of power-saving mode. In this context, the user is likely to prioritize extended battery life and may not require constant connectivity. The AI system 170 may dynamically adjust device settings, such as reducing screen brightness, limiting background data syncing, and switching from cellular data or Satellite to Wi-Fi or ethernet connections when available, to conserve energy and prolong the device's operational time or improve overall performance or cost profiles. The adaptive controls generated by the AI system 170 can be fine-tuned based on individual user preferences and historical data and simulated scenarios of interest in potential future operational envelopes of interest. For instance, if a user frequently accesses their device during hiking for navigation or photography, the AI system 170 can learn from this behavior and recommend a more balanced approach to energy management, ensuring that the device remains functional for the user's specific needs. The AI system 170 may leverage the data collected from various sources, including IoT sensors, weather data, geospatial data, amenity and place data, and user preferences, to create a comprehensive understanding of the user's or device's current situation and future requirements. These same signals can also be integrated into a content curation system where energy management is further assisted by not delivering content that is known to reduce the battery life such as streaming video.

In another embodiment, the mobile nature of the planning and optimization problem faced by this AI enhanced distributed planning and control system, stems from the motion of its celestial body. For example the planning system may be working to maximize data transmission, storage, network and compute efficiency across both earth-based (fixed and mobile) and lunar-based (fixed and mobile) and orbital assets (e.g., passive and active satellites) and LaGrange point (e.g., L1 and L2) based assets. Managing and optimizing data, transport, compute and network storage for a corporation or government across such assets is no small tasks and requires keen understanding of power and network availability windows, as well as the computational and data tasks and capacities from each constituent system component between each Primary, Alternate, Contingent and Emergency communication windows and associated methods. This may optionally utilize emerging protocols such as the Disruption Tolerant Networking (DTN) and DTN bundles demonstrated by NASA during the Lunar Laser Communications Demonstration exercise as part of the LADEE mission that leveraged pulsed lasers to exceed radio signal data transmission rates by approximately 6 times. DTN is considered to be a step towards interplanetary Internet services that require long-distance relay stations or nodes with data persistence and transmission capabilities but it fails to adequately consider the transport, storage, compute, and network type/availability/PACE failover considerations probabilistically which our system can incorporate into individual messages or into routing tables and advertisements or headers. System may also use long-standing or ephemeral optical links to complement wired and wireless networking transmission and radio signals to include protocols such as the Licklider Transmission Protocol which demonstrated reliable optical data transfer from the LLCD onboard the LADEE craft and the Lunar Laser Ground Terminal at White Sands. System may control, change configuration or parameters, or suggest the construction of additional active or passive optical terminals or combinations of optical, wired, wireless and radio transmission links.

Further, the AI system 170 may proactively adjust device settings based on predicted future contexts. By analyzing the user's calendar, travel itinerary, and historical patterns, the AI system 170 can anticipate upcoming situations and recommend appropriate device settings. For example, if the user has a scheduled flight, the AI system 170 may recommend enabling airplane mode and downloading relevant entertainment content in advance to optimize energy and data usage during the journey, especially given the opportunity to download/update/complete compute intensive tasks while plugged into a power source or on a Wi-Fi network versus depleting battery and incurring data usage costs on mobile networks. These may include coordinating with additional devices such as a vehicle charger to ensure the user can drive to the airport, a home or office HVAC system to account for reduced occupancy, and busy/out of office notifications. Similarly, the device may be aware of legal or billing considerations tied to a given provider. For example, a user who may have to pay more or receive slower data services for their cell phone after a certain monthly threshold of cumulative data usage could require the planning and optimization processes to download data more aggressively while on Wi-Fi at the office (on battery power) instead of doing it while driving home when the device will be charging but data usage limits, costs, or quality impacts will occur.

The adaptive controls generated by the AI system 170 are not limited to individual devices but can also be applied to a network of connected devices within the mobile platform ecosystem. For instance, in a smart vehicle, the AI system 170 can dynamically adjust the settings of multiple devices, such as the infotainment system, climate control, and navigation, based on the driver's preferences, passenger needs, and external factors like weather conditions and traffic congestion. By continuously learning from user behavior, contextual data, and device performance metrics, the AI system 170 can refine its recommendations over time, providing an increasingly personalized and optimized mobile experience. The adaptive controls can be presented to the user as suggestions, allowing them to maintain control over their device settings, or can be implemented automatically with the user's consent.

The integration of adaptive device controls generated by an AI system 170 significantly enhances the energy and data optimization capabilities of mobile platforms. By dynamically adjusting device settings based on the user's context, location, and anticipated needs, this invention enables users to maximize the functionality and efficiency of their devices while minimizing energy consumption and data usage. This advancement contributes to a more sustainable, user-centric, and intelligent mobile ecosystem.

In at least one embodiment, the system(s) may also opt into various marketplaces with excess resources. For example, the system(s) may offer/advertise cheap storage or compute to maximize economic value based on their local excess capacity (e.g., energy abundance).

Figure 2:
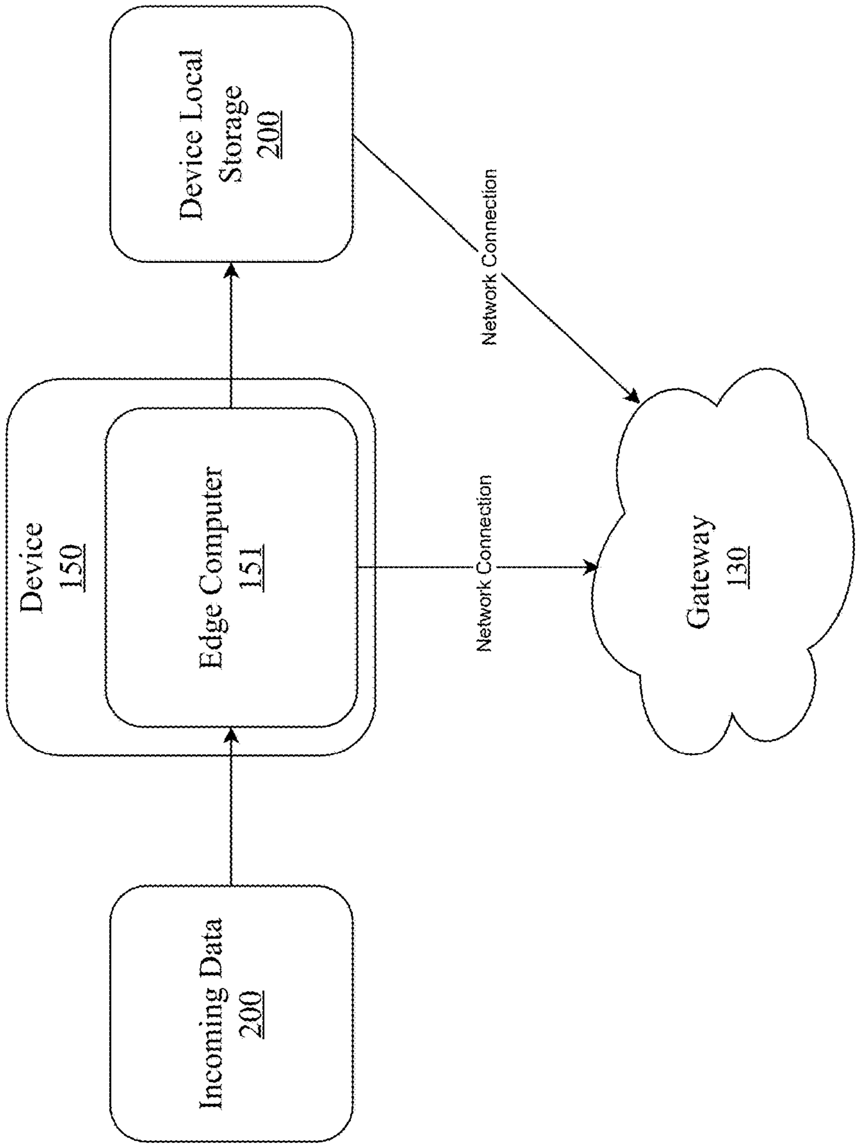
FIG. 2 is a block diagram illustrating an embodiment of the system for mobile energy and data planning and optimization where the data may be immediately sent to the gateway or it may be locally stored and transmitted at a later time.

FIG. 2 is a block diagram illustrating an embodiment of the system for mobile energy and data planning and optimization where the data may be immediately sent to the gateway or it may be locally stored and transmitted at a later time. The device 150 represents a mobile platform, such as a vehicle, tool, or mobile device, equipped with IoT sensors and data processing capabilities. The edge computer 151 is located in close proximity to the device and performs localized data processing and analysis. The device 150 collects data from various sources, including IoT sensors, user interactions, and system performance metrics. This incoming data 200 may be processed locally on the device or transmitted to the edge computer 151 for further analysis.

In one embodiment, the device 150 may have a local storage 200 component, which enables the device to store data locally when immediate transmission is not necessary or optimal. The device local storage can be implemented using various storage technologies, such as but not limited to solid-state drives (SSDs), hard disk drives (HDDs), or flash memory, depending on the specific requirements of the mobile platform.

The decision to store data locally or transmit it immediately is based on several factors, including but not limited to some of the following examples. If the network connection is unstable or unavailable, the device may choose to store data locally until a reliable connection is established. The device can prioritize data based on its importance and urgency. Critical data, such as safety alerts or system failure notifications, can be transmitted immediately, while less urgent data can be stored locally and transmitted later. Transmitting data consumes energy, and in some cases, it may be more energy-efficient to store data locally and transmit it in batches, rather than sending it continuously. By storing data locally and transmitting it during off-peak hours or when network congestion or pricing is comparatively lower, the device can optimize bandwidth usage and reduce data transmission costs. If the device encounters local data indicating such conservatism is not warranted then it may opt-in to a more aggressive state—e.g., critical observations are made. Device level logic and peer level gossip and parent level signaling may all impact such analysis against declared or determined objective function evaluation processes on event or time bases. In tightly coupled practical device configurations, this may occur quite dynamically-such as between a smart watch and a smartphone or smart glasses. It may also be used for more intelligent notification and alerting, e.g., if the watch is actively worn the watch and the phone may not need to both vibrate for a call to preserve battery and deliver a more nuanced user experience across devices. Interaction selection and optimization across devices in such a manner requires ongoing evaluation of the overhead and connectivity and user state information in addition to the respective device states.

The device 150 constantly monitors the network connection and other relevant factors to determine the optimal time to transmit locally stored data. When conditions are favorable, the device initiates data transmission through the gateway 130, which serves as an interface between the device and the rest of the system. When appropriate, the gateway 130 receives the transmitted data and forwards it to the appropriate components of the system, such as the storage system or the data processor, for further analysis and optimization.

Figure 3:
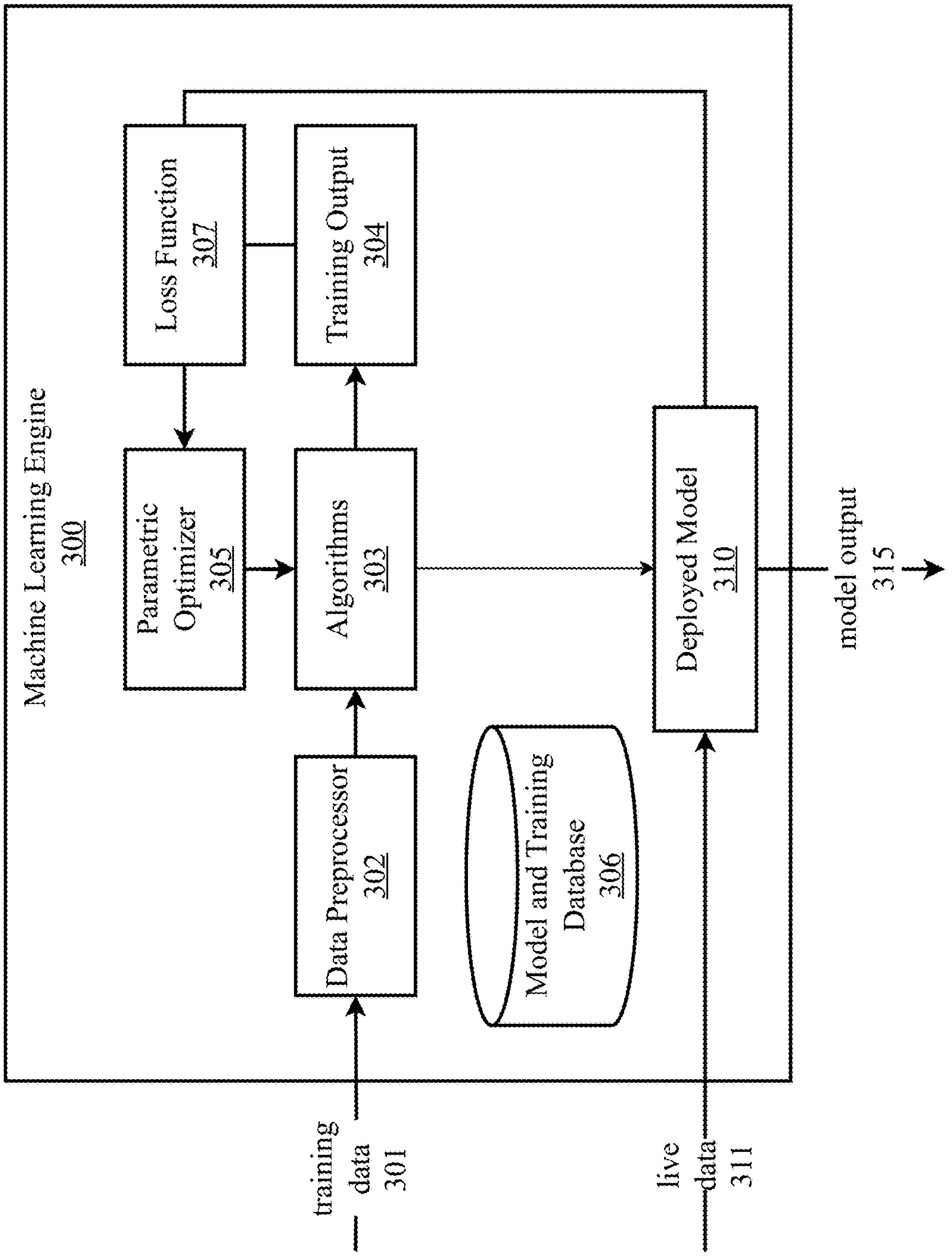
FIG. 3 is a block diagram illustrating an exemplary system architecture for a machine learning engine training system.

FIG. 3 is a block diagram illustrating an exemplary system architecture for a machine learning engine training system. According to the embodiment, machine learning training system 300 may comprise a model training stage comprising a data preprocessor 302, one or more machine and/or deep learning algorithms 303, training output 304, and a parametric optimizer 305, and a model deployment stage comprising a deployed and fully trained model 310 configured to perform tasks described herein such determining correlations between compressed data sets. The machine learning training system 300 may be used to train and deploy the AI system 170 in order to support the services provided by the compression and decompression system.

At the model training stage, a plurality of training data 301 may be received by the correlation network training system 300. In some embodiments, the plurality of training data may be obtained from one or more storage systems 140 and/or directly from the gateway 130. In a use case directed to IoT data sets, a plurality of training data may be sourced from a plurality of IoT sensors. Data preprocessor 302 may receive the input data (e.g., IoT sensor data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 302 may also be configured to create training dataset, a validation dataset, and a test set from the plurality of input data 301. For example, a training dataset may comprise 80% of the preprocessed input data, the validation set 10%, and the test dataset may comprise the remaining 10% of the data. The preprocessed training dataset may be fed as input into one or more machine and/or deep learning algorithms 303 to train a predictive model for object monitoring and detection.

During model training, training output 304 is produced and used to measure the accuracy and usefulness of the predictive outputs. During this process a parametric optimizer 305 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, particle swarm optimization, tabu search, simulated annealing, Monte Carlo tree search, a genetic algorithm etc.), choice of activation function in a neural network layer (e.g., Sigmoid, ReLu, Tanh, etc.), the choice of cost or loss function the model will use, number of hidden layers in a neural network, number of activation units in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by machine learning engine 300 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, personal identifying information/payment card industry redaction, and information gain to name a few. In one embodiment, the system may utilize a loss function 307 to measure the system's performance. The loss function 307 compares the training outputs with an expected output and determines how the algorithm needs to be changed in order to improve the quality of the model output for a given purpose. During the training stage, all outputs may be passed through the loss function 307 on a continuous loop until the algorithms 303 are in a position where they can effectively be incorporated into a deployed model 315. Different combinations may be tested between device level, device and peers, edge, and cloud with different amounts of data, aggregation, and model type/size or training complexity.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 310 in a production environment making predictions based on live input data 311 (e.g., IoT sensor data). Further, model correlations and restorations made by deployed models can be used as feedback and applied to model training in the training stage, wherein the model is continuously learning over time using both training data and live data and predictions. Test batteries, including test input/output combinations tied to acceptable performance thresholds may be stored and distributed to devices in the system for quality control when loading a new model, dataset, or doing device level learning or fine-tuning or other augmentation that may alter device behavior, actions, or control regimes. Results or errors/warnings/debug data from such tests may be optionally shared to peers or higher order systems. A model and training database 306 is present and configured to store training/test datasets and developed models. Database 306 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 303 may comprise a deep learning algorithm such as neural networks (e.g., recurrent, convolutional, long short-term memory networks, etc.). Similarly, planning models may include things like reinforcement learning models paired with Monte Carlo tree search or other stochastic search mechanisms, hierarchical temporal networks, partially observable Markov decision processes, dynamical systems models, or other such approaches for whole system or system component considerations or actual simulation techniques such as discrete event simulation with scenario generation to generate synthetic data for both direct interpretation or use or in training or seeding other modeling techniques.

In some implementations, the AI system 170 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 306.

Figure 4:
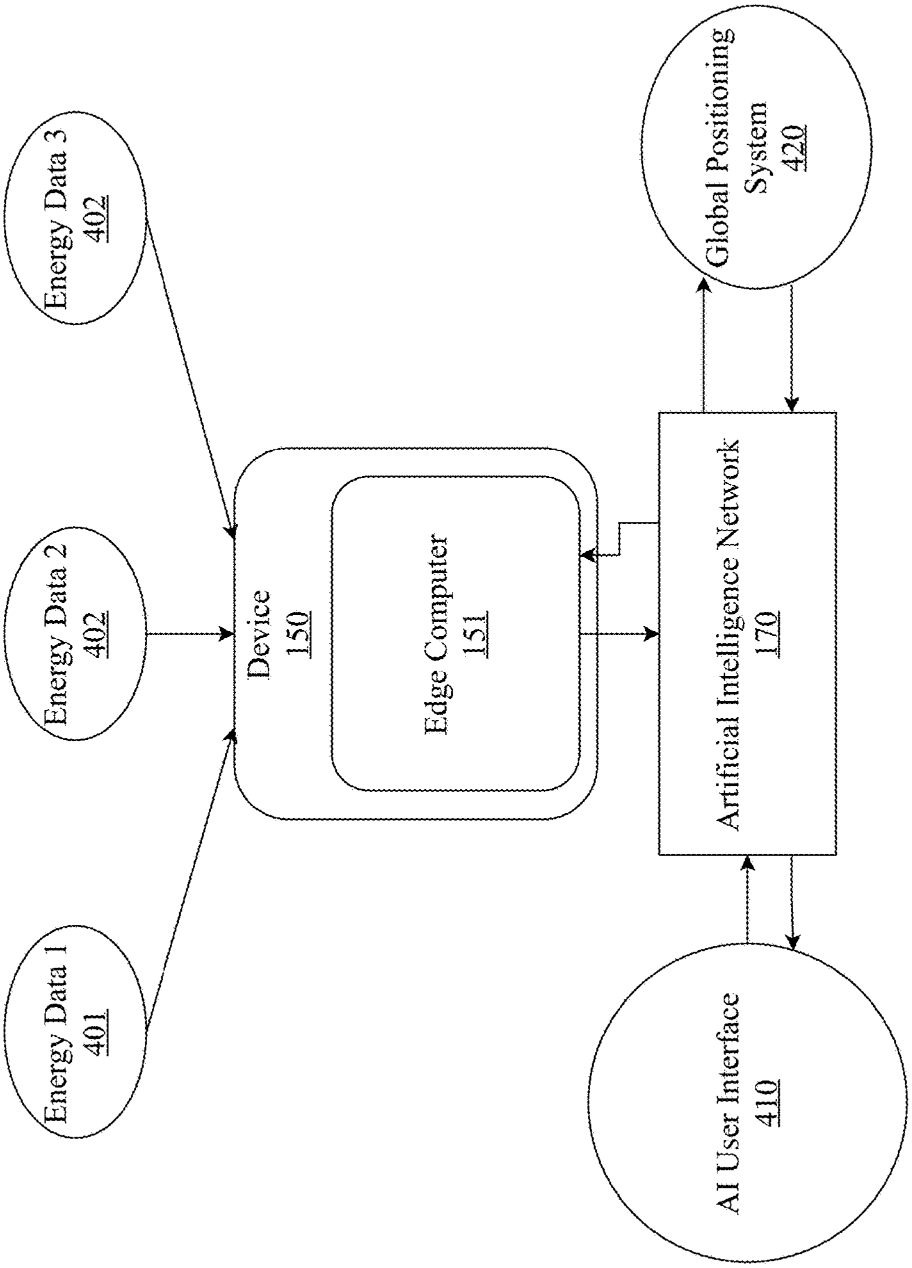
FIG. 4 is a block diagram illustrating an embodiment of the system for mobile energy and data planning and optimization where the system optimizes a plurality of energy systems based on a plurality of incoming energy data.

FIG. 4 is a block diagram illustrating an embodiment of the system for mobile energy and data planning and optimization where the system optimizes a plurality of energy systems based on a plurality of incoming energy data. The system comprises a device 150, an edge computer 151, and an artificial intelligence network 170. The device 150 represents the mobile platform, such as a vehicle or a multi-source powered tool, equipped with multiple energy systems and data processing capabilities. The device 150 may be capable of utilizing multiple energy sources, as indicated by Energy Data 1 401, Energy Data 2 402, and Energy Data 3 403. These energy sources may include, but are not limited to, electric power, fuel cells, solar energy, and traditional fossil fuels. Each energy source is monitored by sensors that collect real-time data on energy consumption, efficiency, and performance.

The collected energy data is transmitted to the edge computer 151 for local processing and analysis. The edge computer 151 is located in close proximity to the device and is responsible for performing real-time energy optimization based on the received data. It analyzes the energy consumption patterns, efficiency metrics, and performance indicators to identify opportunities for optimization. The processed energy data is then sent to the artificial intelligence network 170 via a gateway. In some embodiments, the AI system 170 may be integrated into the device's on board computer. The AI system 170 is a system that leverages advanced machine learning algorithms and big data analytics to provide intelligent recommendations for energy optimization.

The AI system 170 may process the energy data from multiple devices and combine it with external data sources, such as but not limited to weather information, traffic patterns, geopolitical climate, social events (e.g., concerts, parades, protests), and energy market trends. By analyzing this comprehensive dataset, the AI system 170 may generate personalized recommendations for each device to optimize its energy usage and minimize costs. The AI-generated recommendations may be transmitted back to the device 150 through the edge computer 151. These recommendations may include but are not limited to: real-time adjustments to the device's energy management system to optimize the use of multiple energy sources based on their efficiency and availability, predictive maintenance suggestions to prevent energy system failures and improve overall efficiency, and intelligent routing recommendations to minimize energy consumption and maximize the use of renewable energy sources. In the case of military devices, the AI system 170 can also consider factors related to political unrest, acts of war, and other security threats. By analyzing data from various intelligence sources, such as satellite imagery, social media feeds, and on-the-ground reports, the AI system 170 can identify potential risks and optimize energy usage accordingly. For example, if the AI system 170 detects an imminent threat in a specific region, it can recommend that military devices in the area switch to alternative energy sources or implement energy-saving measures to extend their operational capabilities. In situations where supply lines may be disrupted due to political instability or military conflicts, the AI system 170 can suggest strategies for conserving energy and prioritizing critical functions to ensure the device's continued operation.

Furthermore, the AI network 170 can analyze historical data on energy consumption during previous military engagements or peacekeeping missions or geopolitical turmoil impacting civilian devices, airspace, spectrum or other elements to identify patterns and optimize energy usage and communication strategy for future military or civilian asset deployments. By considering factors such as terrain, weather conditions, and the duration of the mission, the AI network 170 can provide personalized recommendations for each military or civilian device to minimize energy waste and enhance operational efficiency. The integration of defense, border security, or even military-specific data sources and the ability to account for political unrest and acts of war enable the AI network 170 to generate tailored energy optimization strategies for military or defense devices or private security devices. This ensures that these devices can operate effectively in challenging environments and maintain their operational readiness, even in the face of both directed or indirectly impacting adversity.

To facilitate seamless interaction between the device 150 and the AI network 170, the system may include an AI user interface 410. This interface allows users to access the AI-generated recommendations, monitor energy performance, and provide feedback to improve the accuracy and relevance of future recommendations. Furthermore, the system may incorporate a global positioning system (GPS or other international equivalences) 420 to enable location-based energy optimization. This may be optionally enhanced for accuracy, security, or corroboration with additional data feeds to defend against attacks like trilateration timing attacks with malicious signals that may be present and identified by system at device, fleet, or system level. The GPS 420 provides real-time location data of the device 150, which is used by the AI network 170 to generate location-specific recommendations. System may also combine GPS with additional location or celestial information such as the position of the Sun, other planets, asteroids, oort cloud objects, the moon, planets of other moons, space debris, or other satellites or structures (which may include space elevators, tethers, or LEO or GEO satellites of earth or satellites around the moon or other planets or their respective moons.

For example, the AI network 170 can analyze the location data in combination with weather forecasts, terrain information, and the availability of fueling or charging stations or of raw materials or of heat differentials (e.g., volatiles or temperature differences or solar energy on the moon's Malapert Mountain rim on the Southern Pole). Based on this analysis, the AI network 170 can recommend the most efficient routes and fueling strategies to minimize energy consumption and costs based on static and mobile energy or communications infrastructure. Such elements don't just apply to cislunar planning and optimization problems but also to oceanic ones. For example, the ability for underwater robotics or life supporting vessels to directly interact with subsea fiber optics or legacy communications cables for robust and faster data transmission along ocean or lake floors in addition to using various satellite or wireless spectrum. The GPS integration also enables the system to optimize energy usage based on the specific operating environment of the device. For instance, if the device is operating in a cold weather condition, the AI network 170 can recommend strategies to optimize the use of heating or cooling systems and minimize the impact of low temperatures on energy efficiency, available energy, and system health and maintenance considerations (both corrective and preventative).

Each component brings a plurality of benefits to energy and data efficiency. The system enables devices to optimize the use of multiple energy sources, leading to improved efficiency and cost savings. The AI system 170 provides intelligent and personalized recommendations for energy optimization, taking into account various external factors and the specific needs of each device. The edge computer 151 enables real-time adjustments to the device's energy management system, ensuring optimal performance and efficiency. The incorporation of GPS 420 enables location-based energy optimization, allowing the system to provide recommendations based on the specific operating environment of the device. The AI user interface 410 allows users to easily access and interact with the AI-generated recommendations, improving the overall user experience and adoption of the system.

Figure 5:
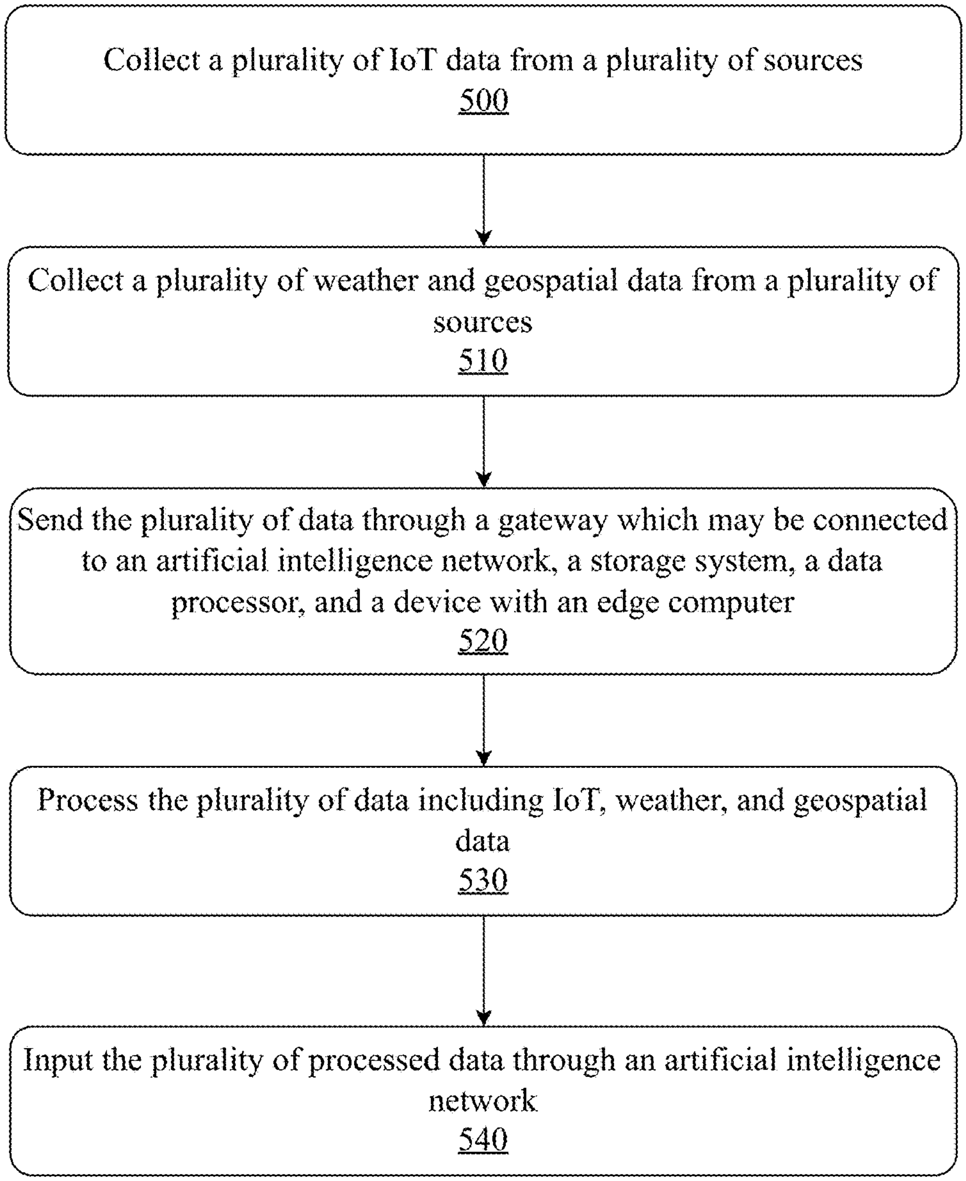
FIG. 5 is a flow diagram illustrating an exemplary method for collecting and processing a plurality of data and where an artificial intelligence network may find optimal states based on the plurality of data.

FIG. 5 is a flow diagram illustrating an exemplary method for collecting and processing a plurality of data and where an artificial intelligence network may find optimal states based on the plurality of data. In a first step 500, collect a plurality of IoT data from a plurality of sources. The system collects data from various Internet of Things (IoT) devices and sensors installed on mobile platforms, such as vehicles, tools, and devices. These IoT devices monitor and record data related to energy consumption, device performance, and operational parameters. The data is collected continuously and in real-time to ensure the most up-to-date information is available for analysis.

In a step 510, collect a plurality of weather and geospatial data from a plurality of sources. The system may gather relevant weather and geospatial data from multiple sources. Weather data includes but is not limited to current and forecasted weather conditions, such as temperature, humidity, wind speed, and precipitation. This data is collected from weather stations, satellites, and other meteorological sources. Geospatial data may comprise information about the geographic location and terrain of the mobile platforms, such as latitude, longitude, elevation, and land use. This data is obtained from GPS devices, geographic information systems (GIS), and other mapping sources.

In a step 520, send the plurality of data through a gateway. The collected data from IoT devices, weather sources, and geospatial sources may be sent through a gateway. The gateway serves as a central hub for data transmission and processing. It is connected to several key components of the system, including: an artificial intelligence network which analyzes the data and generates optimization recommendations using advanced machine learning algorithms, a storage system which securely stores the collected data for future reference and analysis, a data processor which performs data cleaning, transformation, and aggregation to prepare the data for analysis, and a device with an edge computer which enables local data processing and real-time decision-making on the mobile platform. The gateway ensures secure and efficient data transmission between these components, enabling seamless integration and collaboration.

In a step 530, process the plurality of data including IoT, weather, and geospatial data. The data processor and the edge computer work together to process the collected data. The data is cleaned to remove any errors, inconsistencies, or redundancies. It is then transformed and aggregated to create a structured and standardized dataset ready for analysis. The processing step may involve various techniques, such as data normalization, feature extraction, and data compression, to optimize the data for the AI system.

In a step 540, input the plurality of processed data through an artificial intelligence network. The processed data is then fed into the AI system for advanced analysis and optimization. The AI system utilizes various machine learning algorithms, such as deep learning, reinforcement learning, and federated learning, to identify patterns, predict future trends, and generate optimization recommendations. The AI system continuously learns and adapts based on the input data and feedback from the mobile platforms, improving its performance over time.

The AI system may generate actionable insights and recommendations for optimizing energy and data use in the mobile platforms. These recommendations may include but are not limited to: real-time adjustments to device settings and operational parameters to minimize energy consumption and maximize efficiency, predictive maintenance suggestions to prevent device failures and downtime, optimal data transmission schedules based on network availability, data priority, and energy considerations, and personalized route planning and navigation based on weather conditions, terrain, and energy efficiency.

Figure 6:
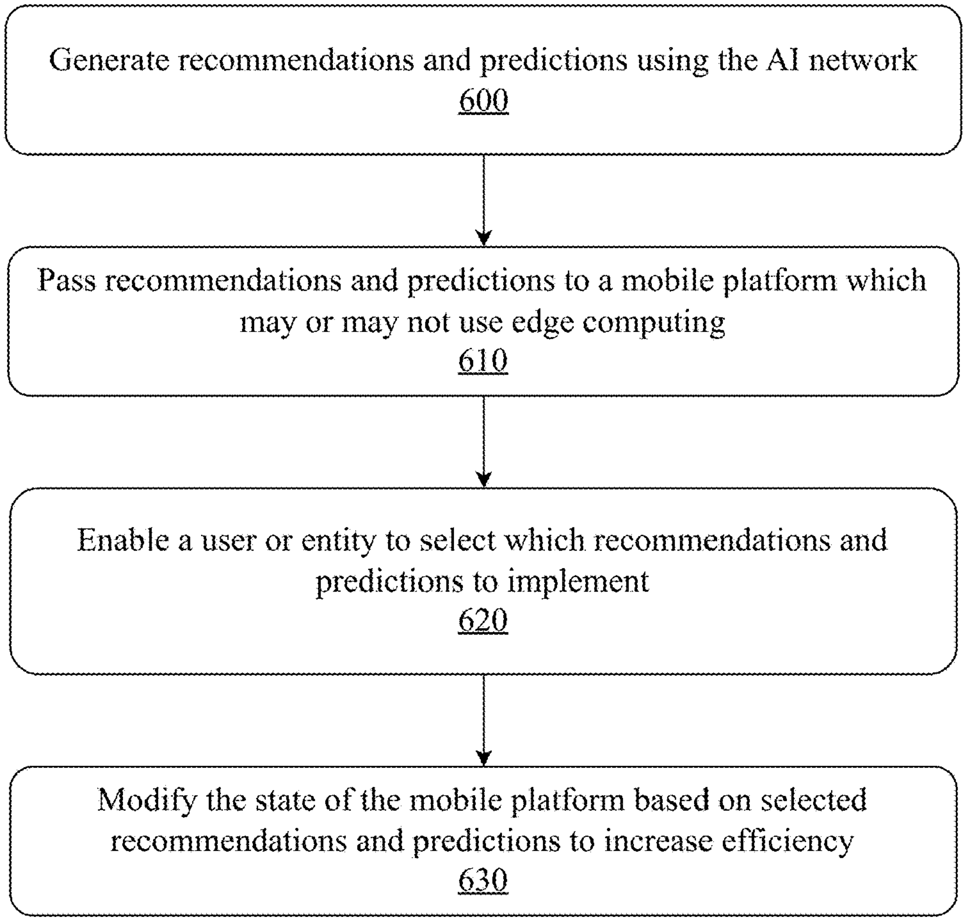
FIG. 6 is a flow diagram illustrating an exemplary method for using optimal states generated by the artificial intelligence network to optimize data and energy consumption or allocation in a corresponding device.

FIG. 6 is a flow diagram illustrating an exemplary method for using optimal states generated by the artificial intelligence network to optimize data and energy consumption or allocation in a corresponding device. In a first step 600, generate recommendations and predictions using the AI system. The AI system analyzes the processed data collected from various sources, including IoT devices, weather stations, and geospatial systems. The AI system utilizes advanced machine learning algorithms, such as deep learning, reinforcement learning, and federated learning, to identify patterns, predict future trends, and generate optimization recommendations. The recommendations and predictions may include: real-time adjustments to device settings and operational parameters to minimize energy consumption and maximize efficiency, predictive maintenance suggestions to prevent device failures and downtime, optimal data transmission schedules based on network availability, data priority, and energy consideration, and personalized route planning and navigation based on weather conditions, terrain, and energy efficiency. The AI system continuously learns and adapts based on the input data and feedback from the mobile platforms, refining its recommendations and predictions over time.

In a step 610, pass recommendations and predictions to a mobile platform. The generated recommendations and predictions are then transmitted to the relevant mobile platform (s) through a secure communication channel. The mobile platform may be equipped with edge computing capabilities, allowing for local processing and real-time decision-making. If the mobile platform has edge computing capabilities, the recommendations and predictions can be processed locally, enabling faster response times and reducing the amount of data that needs to be transmitted to the cloud. If the mobile platform does not have edge computing capabilities, the recommendations and predictions are processed centrally in the cloud and then transmitted back to the platform.

In a step 620, enable a user or entity to select which recommendations and predictions to implement. The system provides a user interface or API that allows users or entities to review the generated recommendations and predictions. The user or entity can then select which recommendations and predictions to implement based on their specific needs, preferences, and constraints. This ensures that the system remains flexible and adaptable to the unique requirements of each mobile platform and its operating environment. For example, a fleet manager may choose to prioritize recommendations that optimize fuel efficiency, while an individual user may prioritize recommendations that enhance the device's performance and user experience.

In a step 630, modify the state of the mobile platform based on selected recommendations and predictions to increase efficiency. Once the user or entity has selected the desired recommendations and predictions, the system proceeds to modify the state of the mobile platform accordingly. This may involve adjusting device settings, reconfiguring operational parameters, or updating data transmission schedules. The modifications are designed to increase the energy and data use efficiency of the mobile platform, based on the insights and optimizations provided by the AI system. The system continuously monitors the performance of the mobile platform and collects feedback data to assess the effectiveness of the implemented recommendations.

Detailed Description of Exemplary Aspects

Figure 7:
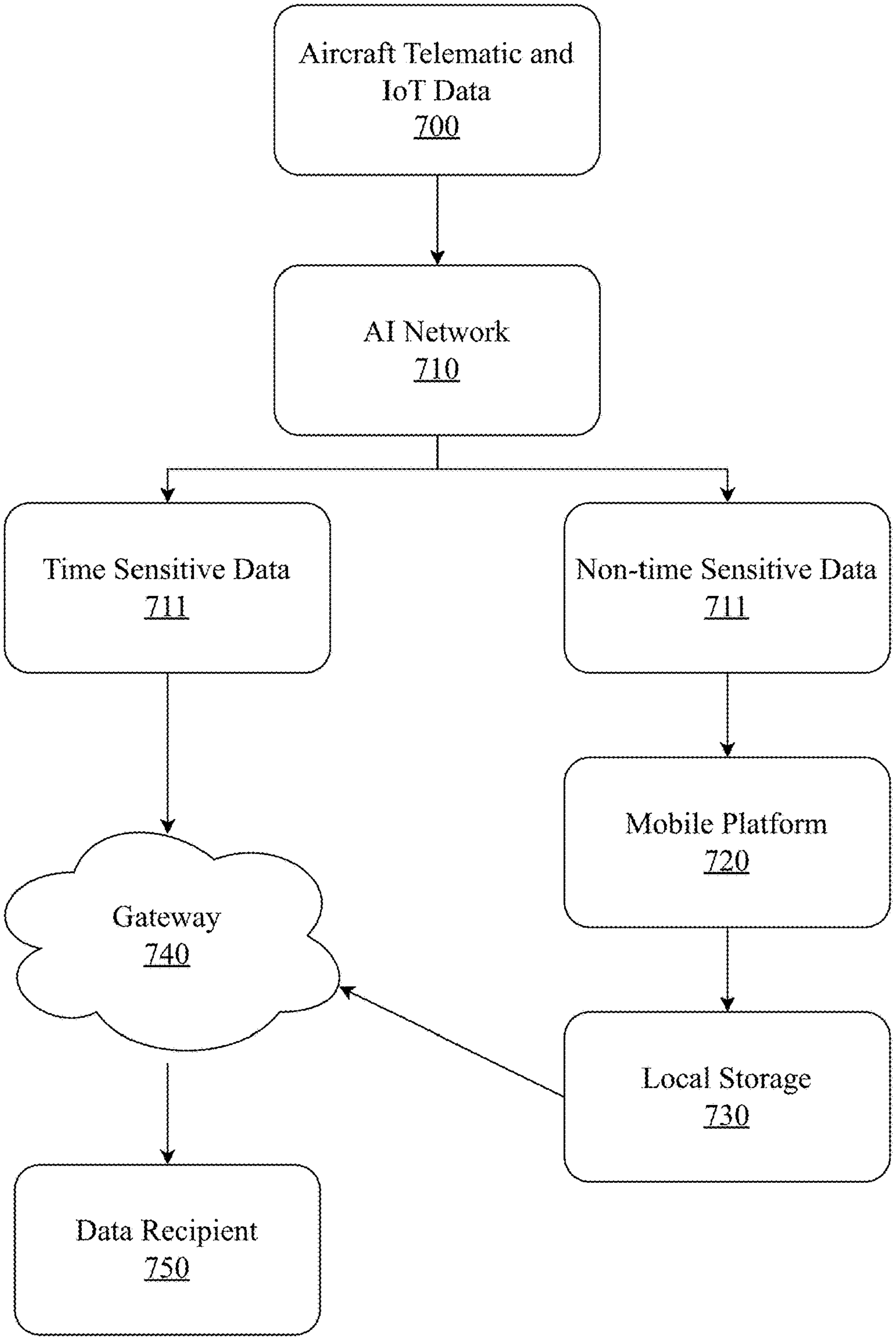
FIG. 7 is a diagram showing an embodiment or a system where aircraft or vehicle data may be categorized by an AI system to determine the appropriate time and place for data transmission.
Figure 8:
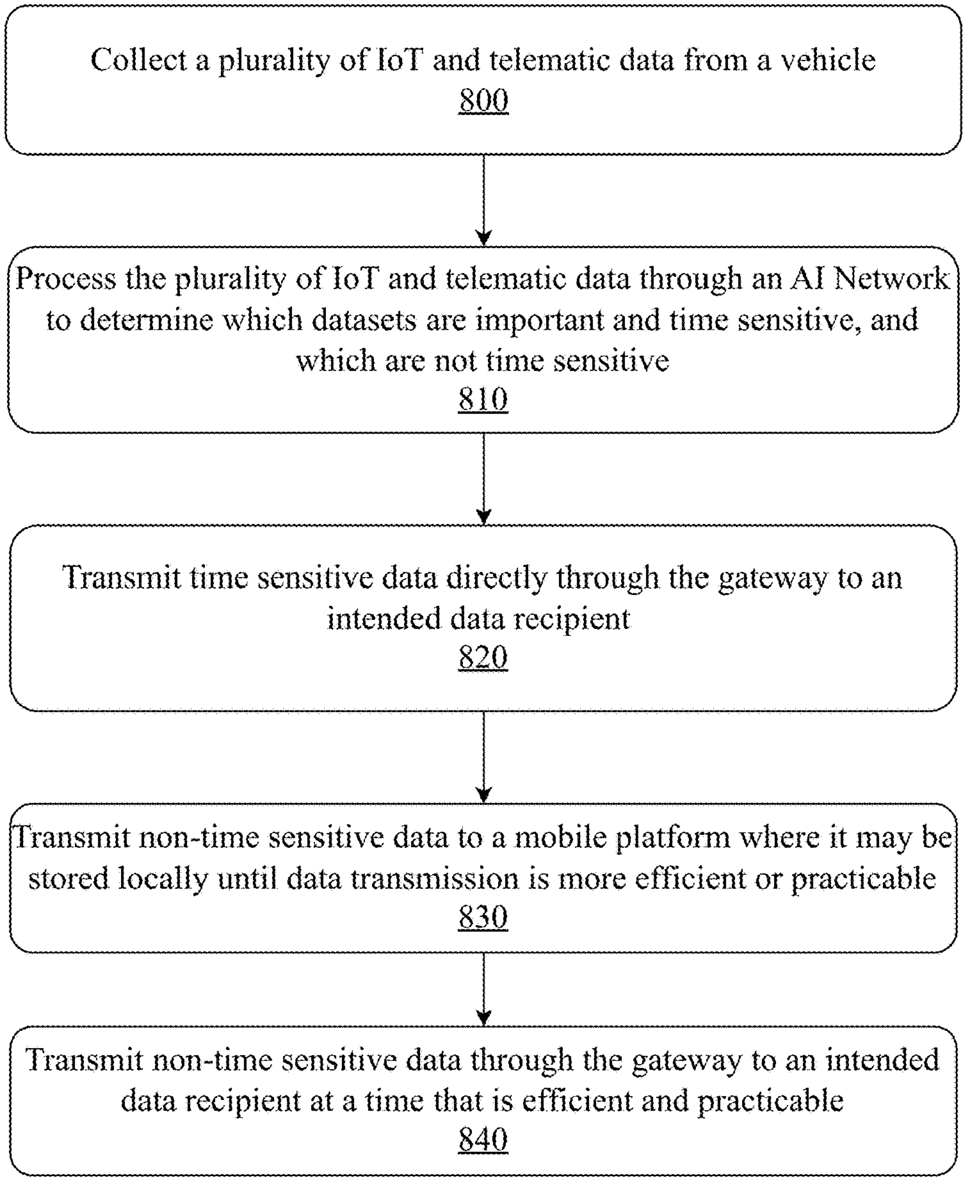
FIG. 8 is a flow diagram showing an embodiment of a method where aircraft or vehicle data may be categorized by an AI system to determine the appropriate time and place for data transmission.

FIG. 7 is a diagram showing an embodiment where aircraft or vehicle data may be categorized by an AI system to determine the appropriate time and place for data transmission. In one embodiment, the system may include Aircraft Telematic and IoT Data 700. In an aircraft or vehicle embodiment, the system may collect a wide range of data from various sources within the aircraft or vehicle, including but not limited to telematic systems and Internet of Things (IoT) devices. This data encompasses flight performance metrics, engine health parameters, avionics data, sensor readings, and other relevant information that reflects the overall state and performance of the aircraft.

An AI system 710 analyzes the collected data and makes intelligent decisions regarding data transmission and storage. The AI system utilizes advanced machine learning algorithms, such as but not limited to deep learning and reinforcement learning, to assess the time sensitivity and importance of each dataset. After processing, the AI system 710 may categorize the data based on factors such as how time sensitive the data is.

Time-sensitive data 711 includes critical information that requires immediate transmission, such as emergency alerts, system malfunctions, or abnormal flight conditions. In the event of an emergency, such as an aircraft accident, the AI system 710 prioritizes the transmission of vital data, including the information typically stored in the aircraft's black box (flight data recorder and cockpit voice recorder). By transmitting this data in real-time, the system ensures that crucial evidence and insights are available to investigators and authorities even if the physical black box is damaged or inaccessible.

Non-time sensitive data 712 encompasses data that is important for long-term analysis and performance optimization but does not require immediate transmission. Examples include regular flight performance metrics, engine health data, and passenger information. The AI system determines the optimal time and method for transmitting this data, considering factors such as network availability, transmission costs, and data storage constraints. The mobile platform 720 represents the aircraft or vehicle itself, which is equipped with various systems and devices that generate and collect data. The mobile platform includes an onboard data processing unit that communicates with the AI system and executes the data transmission and storage decisions made by the network. During instances where data is determined to be non-time sensitive 712, local data storage capabilities within the aircraft or vehicle allow non-time-sensitive data to be stored onboard until it can be efficiently transmitted to the ground. The local storage system is designed to be robust, secure, and capable of withstanding extreme conditions, ensuring the integrity and availability of the stored data.

The gateway 740 serves as the communication interface between the aircraft and the ground systems. It enables the secure and reliable transmission of data from the aircraft to the data recipients, such as airline operations centers, maintenance facilities, and air traffic control systems. The gateway utilizes advanced communication protocols and encryption techniques to ensure the confidentiality and integrity of the transmitted data. The data recipients 750 are the various stakeholders and systems that require access to the aircraft data for analysis, decision-making, and optimization. These recipients may include but are not limited to airline operations centers, maintenance teams, air traffic control systems, and incident investigation authorities. The system ensures that the right data is delivered to the right recipient at the right time, based on the decisions made by the AI system.

In a first step 800, collect a plurality of IoT and telematic data from a vehicle. The system collects a wide range of data from various sources within the vehicle, including but not limited to Internet of Things (IoT) devices and telematic systems. This data encompasses vehicle performance metrics, engine health parameters, driver behavior data, sensor readings, and other relevant information that reflects the overall state and performance of the vehicle.

In a step 810, process the plurality of IoT and telematic data through an AI system. The collected data is processed through an AI system that analyzes and categorizes the data based on its time sensitivity and importance. The AI system utilizes advanced machine learning algorithms, such as deep learning and reinforcement learning, to assess the criticality and urgency of each dataset. Data may be categorized into time sensitive data and non-time sensitive data.

Time sensitive data includes critical information that requires immediate transmission, such as emergency alerts, system malfunctions, or abnormal vehicle conditions. In the event of a serious incident or accident, the AI system prioritizes the transmission of vital data, such as the vehicle's location, speed, and sensor readings, to ensure that emergency responders and authorities have access to crucial information in real-time.

Non-time sensitive data encompasses data that is important for long-term analysis and performance optimization but does not require immediate transmission. Examples include regular vehicle performance metrics, engine health data, and driver behavior patterns. The AI system determines the optimal time and method for transmitting this data, considering factors such as network availability, transmission costs, and data storage constraints.

In a step 820, transmit time sensitive data directly through the gateway to an intended data recipient. For time sensitive data, the system immediately transmits the information through a gateway to the intended data recipient. The gateway serves as the communication interface between the vehicle and the external systems, such as emergency services, fleet management centers, or vehicle manufacturers. The transmission of time-sensitive data is prioritized to ensure that critical information reaches the intended recipient without delay.

In a step 830, transmit non-time sensitive data to a mobile platform for local storage. Non-time sensitive data is transmitted to the vehicle's mobile platform, which is equipped with local storage capabilities. The local storage system securely stores the data until it can be efficiently transmitted to the intended recipient or intermediate transmission and networking nodes or waypoints (e.g., in DTN). The mobile platform's storage capacity is designed to accommodate the volume of non-time sensitive data generated by the vehicle over extended periods with variable levels of importance depending on the time periods between connectivity windows and network transport bandwidth, cost, and energy usage during windows.

In a step 840, transmit non-time sensitive data through the gateway to an intended data recipient. When the conditions for efficient and practicable data transmission are met, the system transmits the stored non-time-sensitive data through the gateway to the intended data recipient. The AI system determines the optimal time and method for transmission, considering factors such as network availability, transmission costs, and recipient requirements. By transmitting non-time sensitive data during off-peak hours or when network congestion is low, the system minimizes transmission costs and ensures the efficient use of network resources.

Figure 9:
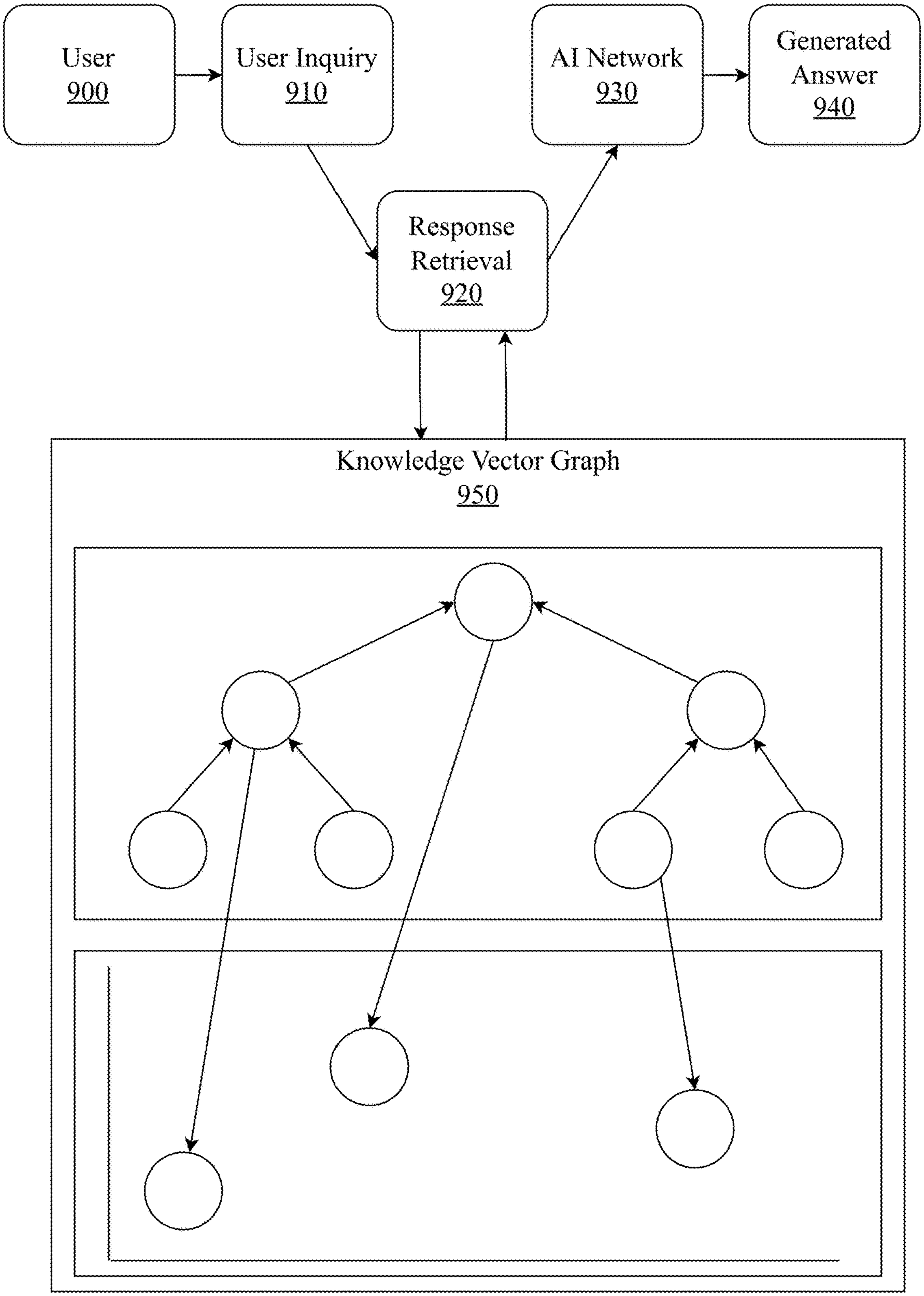
FIG. 9 is a block diagram illustrating an exemplary embodiment of the system where the system is configured to process user questions and inquiries through a knowledge vector graph and an AI system.

FIG. 9 is a block diagram illustrating an exemplary embodiment of the system where the system is configured to process user questions and inquiries through a knowledge and/or vector graph and an AI system. A user 900 represents an individual who interacts with the system through a mobile platform, such as a vehicle, smartphone, or another connected device. The user can pose a wide range of questions related to their current context, such as location, route, weather conditions, or other factors relevant to their mobile experience. The user inquiry 910 is the question or request posed by the user to the system. The inquiry can be in the form of natural language text, voice input, or structured data entered through a user interface. Examples of user inquiries include questions related to locating services, medical facilities, fuel stations, or even finding clear patches of the night sky based on current cloud cover and light pollution levels.

In some embodiments, the system may be configured to cater to astronomy or astrophotography needs where a user desires clear skies, low light pollution, and high visibility of the night sky. The system may include a visibility parameter where the plurality of collected data is parsed and analyzed for a route and destination that offer the highest visibility of the night sky. This analysis may include identifying predicted fog zones, selecting areas of low light pollution, and identifying areas of low atmospheric turbulence based on factors such as temperature. The system may enable a user to find a destination which maximizes the visibility parameter while providing an efficient route to reach the destination that maximizes energy and data usage.

A knowledge vector graph 950, is a representation of structured and interconnected data. The knowledge vector graph 950 maps various concepts, entities, and relationships to high-dimensional vectors in a continuous space. In this vector space, semantically similar concepts are represented by vectors that are close to each other, while dissimilar concepts are represented by vectors that are far apart.

The knowledge vector graph is constructed using advanced techniques such as graph embedding and unsupervised learning algorithms. It incorporates a wide range of data sources, including but not limited to, locations of hospitals, gas stations, charging points, and other points of interest, current and forecasted weather conditions, cloud cover, and light pollution levels, real-time traffic information, road closures, and congestion levels, vehicle energy efficiency, charging station availability, and energy costs, individual user preferences, past inquiries, and behavior patterns. By organizing this diverse data into a unified vector space, the knowledge vector graph enables efficient and accurate retrieval of relevant information based on the user's inquiry.

When a user inquiry is received, the system processes the inquiry and maps it to a corresponding vector representation using natural language processing techniques such as word embedding or sentence encoders. The mapped vector is then used to query the knowledge vector graph to retrieve the most relevant information. The response retrieval process involves finding the vectors in the knowledge vector graph that are most similar to the mapped inquiry vector. This is typically achieved using similarity measures such as cosine similarity or Euclidean distance. The system retrieves the top-k most similar vectors, where k is a configurable parameter that determines the number of relevant results to consider.

The retrieved vectors from the knowledge vector graph are passed through an AI system 930 for further processing and response generation. The AI system is a deep learning model trained on a large corpus of text data, such as question-answer pairs, knowledge bases, and domain-specific literature. The AI system takes the retrieved vectors as input and generates a natural language response that directly addresses the user's inquiry. The AI system can perform tasks such as but not limited to, combining information from multiple retrieved vectors to provide a comprehensive response, considering the user's current context, such as location, time, and previous interactions, to generate a personalized response, and providing explanations or justifications for the generated response to enhance user understanding and trust.

The AI system may be trained using advanced techniques such as transformer architectures, attention mechanisms, and reinforcement learning to generate high-quality, coherent, and relevant responses. The final output of the system is the generated answer 940, which is a natural language response to the user's inquiry. The generated answer is transmitted back to the user's device and presented through a user-friendly interface, such as a voice assistant, chatbot, or text display.

Figure 10:
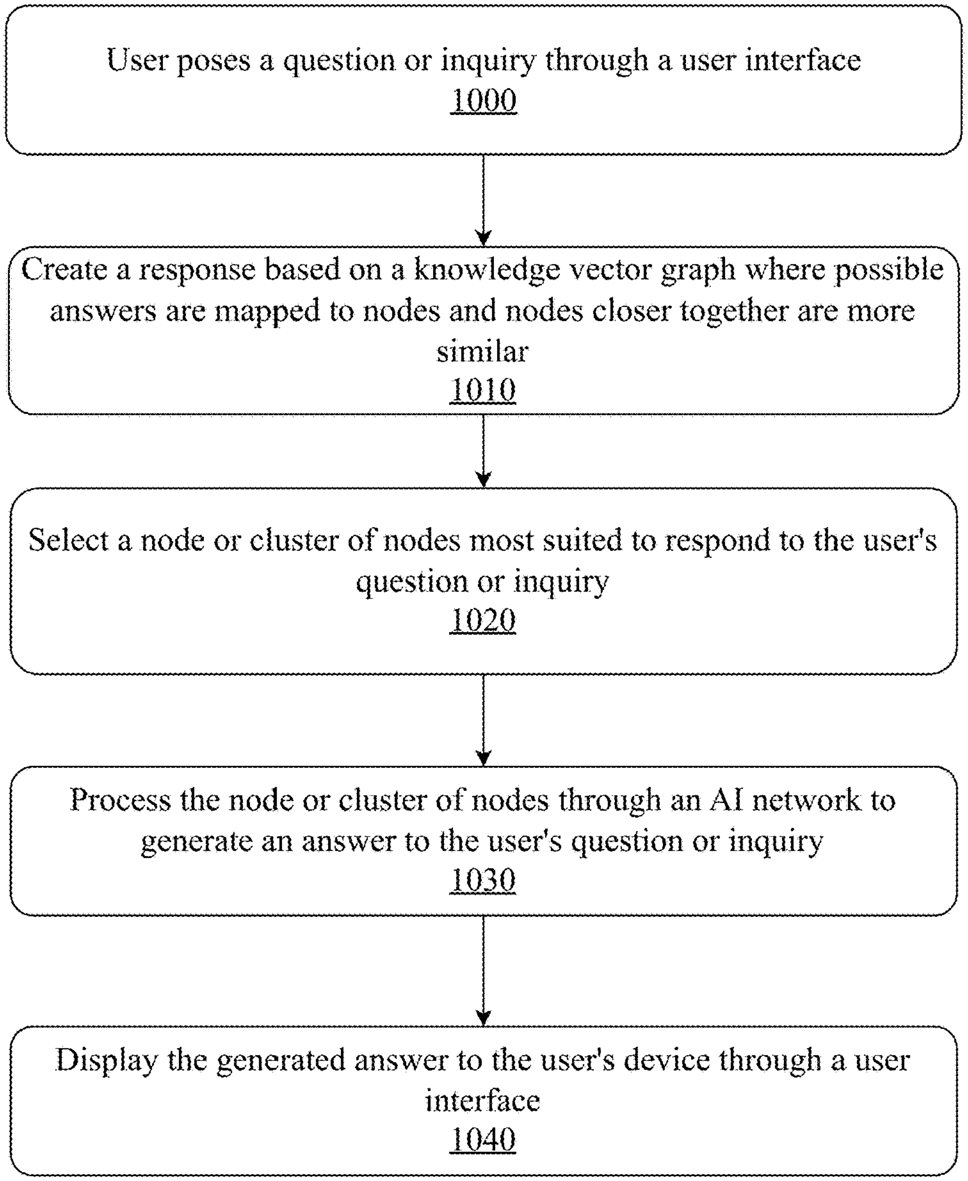
FIG. 10 is a flow diagram illustrating an exemplary embodiment of a method where the method processes user questions through a knowledge vector graph and an AI system to generate an answer.

FIG. 10 is a flow diagram illustrating an exemplary embodiment of a method where the method processes user questions through a knowledge vector graph and an AI system to generate an answer. In a first step 1000, a user poses a question or inquiry through a user interface. The user may pose a question or inquiry through a user interface on their mobile platform, such as a vehicle, smartphone, or another connected device. The user interface may support various input modalities, such as natural language text, voice input, or structured data entry.

In a step 1010, create a response based on a composite knowledge graph and vector graph. Upon receiving the user inquiry, the system processes the inquiry and maps it to a corresponding vector representation using natural language processing techniques, such as word embeddings or sentence encoders. This mapped vector is then used to query a knowledge vector graph, which is a representation of structured and interconnected data. The knowledge vector graph maps various concepts, entities, and relationships to high-dimensional vectors in a continuous space. Semantically similar concepts are represented by vectors that are close to each other, while dissimilar concepts are represented by vectors that are far apart. The knowledge vector graph incorporates a wide range of data sources, including geographic information, weather data, traffic data, energy consumption data, and user preferences. By querying the knowledge vector graph with the mapped inquiry vector, the system retrieves the most relevant information for generating a response.

In a step 1020, select a node or cluster of nodes most suited to respond to the user's question or inquiry. From the knowledge vector graph, the system selects the node or cluster of nodes that are most suited to respond to the user's question or inquiry. This selection is based on the similarity between the mapped inquiry vector and the vectors representing the nodes in the graph. The system employs similarity measures, such as cosine similarity or Euclidean distance, to determine the relevance of each node to the user's inquiry. The top-k most similar nodes, where k is a configurable parameter, are selected as the candidate nodes for response generation.

In a step 1030, process the node or cluster of nodes through an AI system to generate an answer. The selected node or cluster of nodes from the knowledge vector graph may be processed through an AI system to generate a natural language answer to the user's question or inquiry. The AI system is a deep learning model trained on a large corpus of text data, such as question-answer pairs, knowledge bases, and domain-specific literature. The AI system takes the selected nodes as input and performs tasks such as but not limited to information synthesis, context-aware reasoning, and explanation generation to produce a coherent and relevant response. The network leverages advanced techniques, such as transformer architectures, attention mechanisms, and reinforcement learning, to generate high-quality responses.

In a step 1040, display the generated answer to the user's device through a user interface. The answer is transmitted from the AI system to the user's mobile platform and presented in a format that is easy to understand and interact with, such as a voice assistant's response, a chatbot's message, or a text display.

Figure 11:
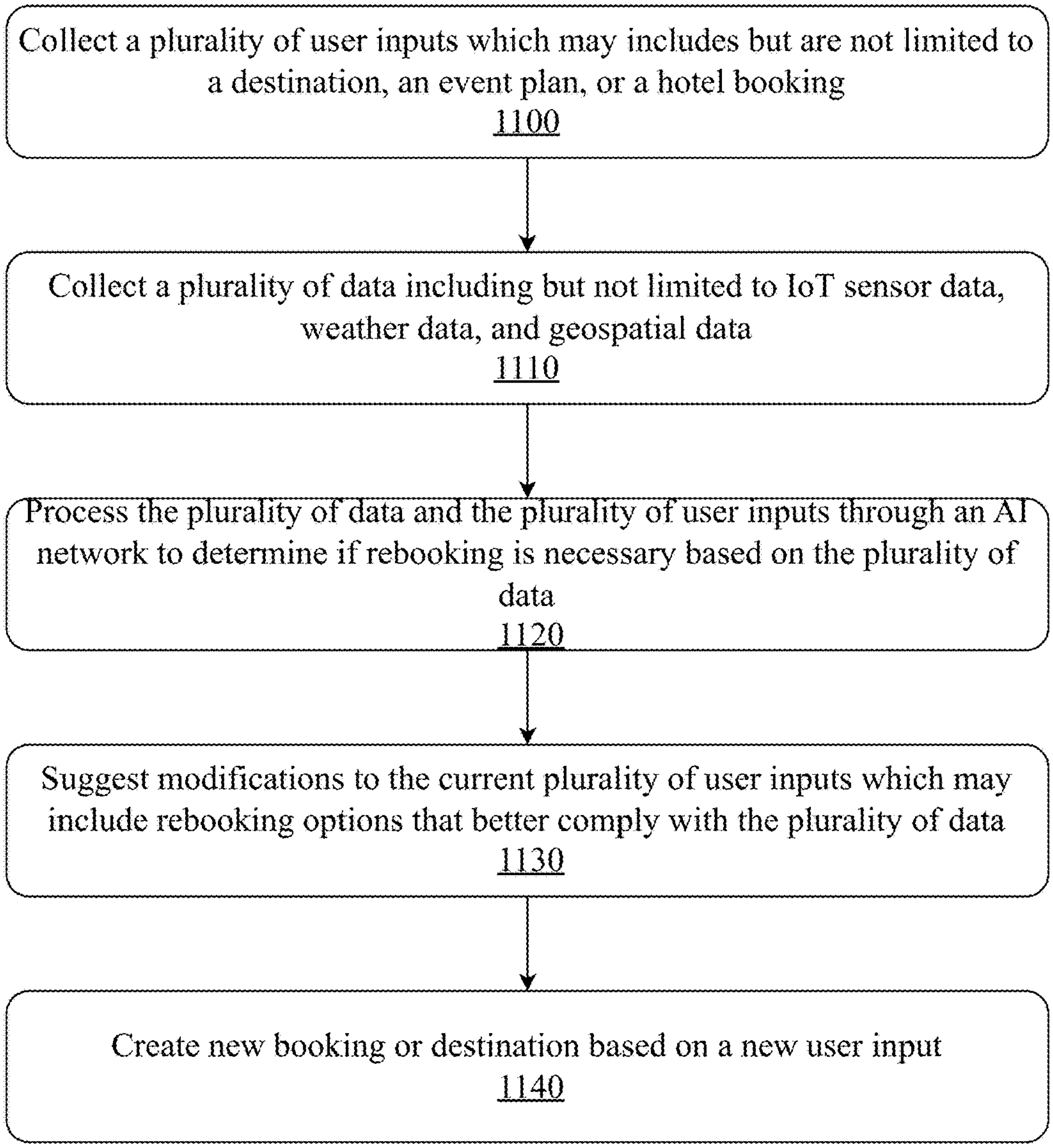
FIG. 11 is a flow diagram illustrating an exemplary embodiment of a method for rebooking or rescheduling events or reservations.

FIG. 11 is a flow diagram illustrating an exemplary embodiment of a method for rebooking or rescheduling events or reservations. In a first step 1100, collect a plurality of user inputs through a user interface on a mobile platform, such as a smartphone, tablet, or laptop. These user inputs may include, but are not limited to, the user's planned travel destination, such as a city, region, or specific location, the user's scheduled events, such as conferences, meetings, or leisure activities, or the user's hotel reservations, including the location, dates, and preferences. The user inputs are captured by the user interface and transmitted to the system for processing.

In a step 1110, collect a plurality of data of contextual data from various sources including but not limited to IoT sensor data such as weather stations, traffic sensors, and air quality monitors, providing real-time information about the user's destination and surrounding areas, detailed weather forecasts and historical weather patterns for the user's planned destination and dates, or geographic information about the user's destination, including maps, points of interest, and proximity to alternative locations. The collected data is transmitted to AI system 170 for processing and analysis.

In a step 1120, process the plurality of data and user inputs through an AI system. The system processes the collected user inputs and contextual data through an AI system 170 to determine if rebooking or modification of the user's plans is necessary. The AI system 170 analyzes the data to identify potential issues or opportunities for optimization. Examples may include but are not limited to severe weather conditions, travel disruptions, or improved alternatives.

If the AI system 170 detects that the user's planned destination is expected to experience severe weather conditions, such as a major storm or hurricane, it flags the booking for potential modification. If the AI system 170 identifies potential travel disruptions, such as flight cancellations, road closures, or public transportation delays, it considers alternative options for the user's plans. The AI system 170 explores alternative destinations, accommodations, or event venues that may better suit the user's preferences and the current contextual data, such as locations with more favorable weather conditions or closer proximity to the user's planned activities. The AI system 170 may utilize advanced machine learning techniques, such as deep learning, reinforcement learning, and natural language processing, to analyze the complex relationships between the user inputs and contextual data, generating intelligent insights and recommendations.

In a step 1130, suggest modifications to the current user inputs. Based on the AI system's 170 analysis, the system may generate personalized suggestions for modifying or rebooking the user's plans. These suggestions may include but are not limited to alternate destinations, rescheduled events, or optimized accommodations. If the user's planned destination is expected to experience severe weather or other disruptions, the system may suggest alternative locations nearby that offer more favorable conditions.

If the user's planned events are likely to be impacted by external factors, the system may propose alternative dates or times that minimize potential disruptions. The system may recommend alternative hotel bookings that better align with the user's preferences and the current contextual data, such as accommodations with more reliable weather protection or closer proximity to the user's modified plans. The system presents these suggestions to the user through the user interface, along with clear explanations of the reasoning behind each recommendation. The user can review the suggestions and decide whether to accept the proposed modifications or proceed with their original plans.

In a step 1140, create new booking or destination based on user input. If the user accepts the suggested modifications or provides new inputs based on the system's recommendations, the method proceeds to create new bookings or update the user's destination accordingly. This may involve rebooking accommodations, updating event plans, or revising travel arrangements. The system may automatically cancel the user's existing hotel reservations and book new accommodations based on the accepted suggestions, ensuring a seamless transition for the user. The system may modify the user's event schedule, including cancellations, rescheduling, or new bookings, based on the user's input and the AI system's 170 recommendations. The system may update the user's travel plans, such as transportation bookings or rental car reservations, to align with the modified destination or schedule. Throughout the process, the system maintains clear communication with the user, providing updates on the status of their bookings and any necessary actions required from the user.

Figure 12:
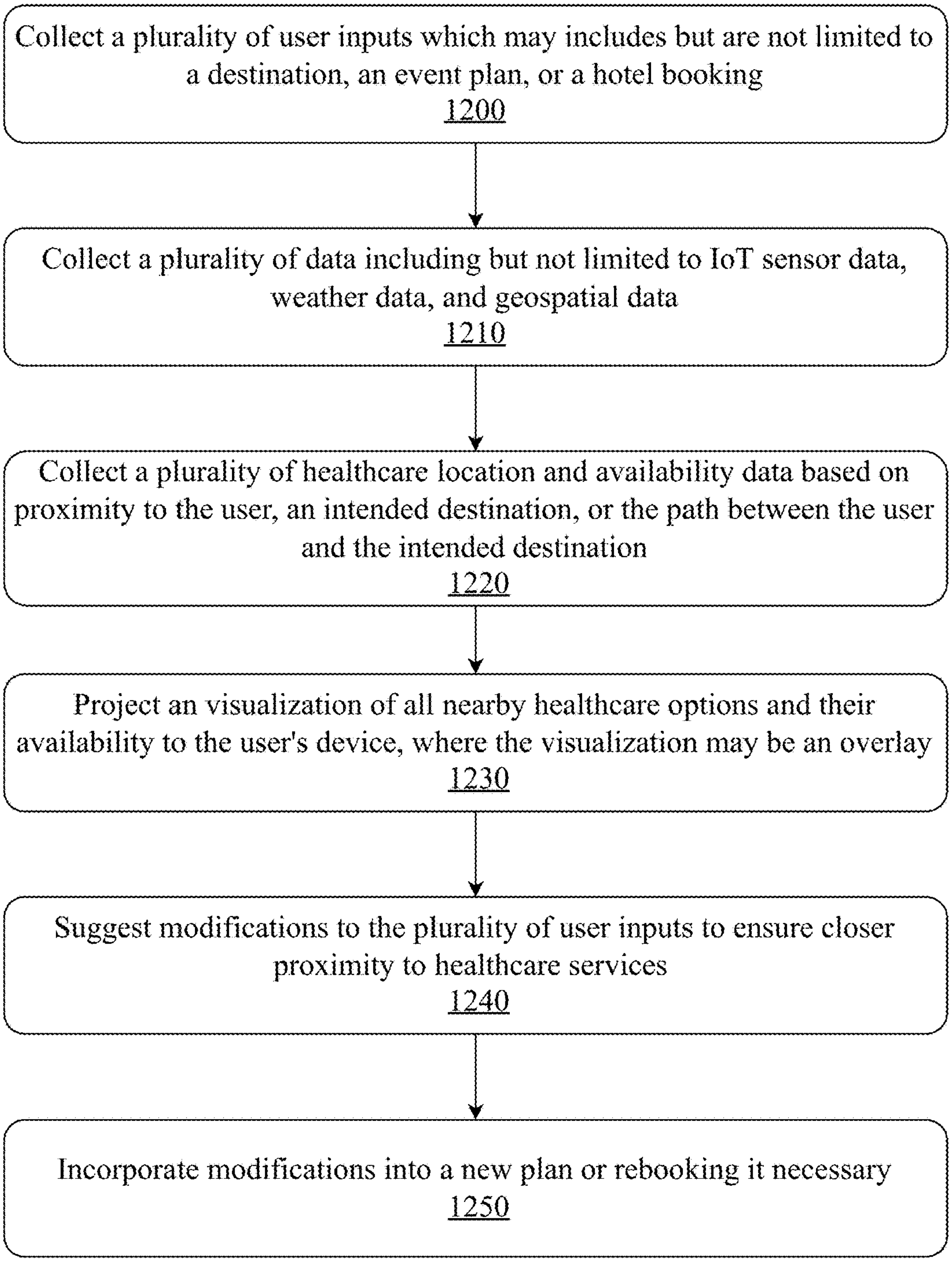
FIG. 12 is a flow diagram illustrating an exemplary embodiment of a method for incorporating healthcare proximity and accessibility data into the user's overlay.

FIG. 12 is a flow diagram illustrating an exemplary embodiment of a method for incorporating healthcare proximity and accessibility data into the user's overlay. In a first step 1200, collect a plurality of user inputs through a user interface on a mobile platform, such as a smartphone, tablet, or laptop. These user inputs may include, but are not limited to destination, event plans, or hotel bookings. Additionally, the user may provide information about their specific healthcare needs, such as regular dialysis treatments, medical appointments, or accessibility requirements.

In a step 1210, collect a plurality of data from various sources including but not limited to IoT sensor data, weather data, and geospatial data. The collected data may be transmitted to the AI system 170 for processing and analysis.

In a step 1220, collect healthcare location and availability data. In addition to the contextual data, the system may also collect information about healthcare locations and their availability based on a plurality of criteria. The system may identify healthcare facilities, such as hospitals, clinics, and medical centers, which are in close proximity to the user's current location. The system may locate healthcare facilities near the user's planned destination, ensuring easy access to medical services during their stay. Additionally, the system may identify healthcare facilities along the user's planned route, providing options for medical assistance en route to their destination. The healthcare location and availability data are collected from various sources, such as public health databases, hospital directories, and real-time updates from medical facilities.

In a step 1230, project a visualization of nearby healthcare options. Using the collected healthcare location and availability data, the system may project a visualization of all nearby healthcare options to the user's device. This visualization may be presented as an overlay on a map (e.g., a 2-D or 3-D map with options for layers or imagery or other implications or complications from real or inferred data), showing the user's current location, planned destination, and the locations of healthcare facilities in relation to their path. In one embodiment the system may also be temporally enhanced (e.g., a 4-D projection) to add time to cartesian space. Other forms of coordinates may also be used for efficiency or communications effectiveness such as the use of Polar instead of Cartesian coordinates. The visualization may include additional information about each healthcare facility, such as but not limited to, the type of facility, the services offered, availability, and distance and estimated travel time. The user can interact with the visualization to explore different healthcare options, view detailed information, and make informed decisions about their trip planning.

In a step 1240, suggest modifications to user inputs. Based on the user's specific healthcare needs and the proximity of healthcare facilities to their planned destination, the system suggests modifications to the user's inputs to ensure closer proximity to necessary medical services. These suggestions may include, alternative accommodations, modified event locations, and adjusted travel routes. If the user's planned hotel is not within close proximity to a required healthcare facility, the system may suggest alternative accommodations that are nearer to the needed medical services. If the user's scheduled events are located far from essential healthcare facilities, the system may propose alternative event locations or venues that are closer to the required medical services. Likewise, the system may suggest modifications to the user's planned travel route to ensure easier access to healthcare facilities along the way, particularly if the user requires frequent medical attention or has specific accessibility needs.

In a step 1250, incorporate modifications into a new plan or rebooking. If the user accepts the suggested modifications, the system incorporates the changes into a new trip plan or initiates a rebooking process as necessary. This may involve rebooking accommodations, updating event plans, and revising travel arrangements. The system may automatically cancel the user's existing hotel reservations and books new accommodations that are in closer proximity to the required healthcare facilities. The system may modify the user's event schedule, including changes to event locations or venues, to ensure easier access to necessary medical services. The system may update the user's travel plans, such as transportation bookings or rental car reservations, to align with the modified itinerary and healthcare considerations.

In embodiments with a booking/rebooking capability, the system may utilize an Action Notation Modeling Language (ANML) or similar protocol to adjust reservations or preferences, and to accumulate personal knowledge, preferences, and overlays which may or may not be imported to a physical or virtual environment. In one embodiment, the AI system 170 may incorporate a deep learning architecture such as a Convolutional Neural Network (CNN). The AI system 170 may utilize a plurality of CNN-based techniques to automate planning and optimization, for example, Value Iteration Networks (VINs) and Differential Planning Networks (DPNs). VINs utilize CNNs to learn value functions and policies for planning in grid-world environments. A VIN is designed to learn an approximation of the optimal value function, which represents the expected long-term reward for each state in the environment under a given policy. Exemplary pseudocode demonstrating some of the core components of a VIN using PyTorch may be found in APPENDIX A.

A DPN is a neural network architecture designed for automated planning tasks. It combines the strengths of deep learning and classical planning algorithms to learn and optimize planning strategies in an end-to-end fashion. The DPN takes a representation of the planning problem as input, such as a graph or a feature vector, and learns to generate a plan or a sequence of actions that optimizes a given objective. The key feature of a DPN is its differentiable nature, which allows the network to be trained using gradient-based optimization techniques. By propagating gradients through the planning process, the DPN can learn to adapt its planning strategies based on the feedback received from the environment or the loss function. This enables the DPN to handle complex planning problems, generalize to unseen situations, and integrate seamlessly with other deep learning components in a larger system. Exemplary pseudocode demonstrating some of the core components of a DPN using PyTorch may be found in APPENDIX B.

In some embodiments, the AI network 170 may utilize a Graph Neural Network-based Differential Planner (GNN-based DPN) to automate planning and optimization. A GNN-based DPN is a neural network architecture designed for automated planning tasks. It takes a graph representation of the planning problem as input, where nodes represent states and edges represent actions. The network consists of multiple GNN layers that perform message passing and feature aggregation, allowing it to capture local dependencies and interactions between nodes. An attention mechanism is incorporated to focus on the most relevant parts of the graph during planning. The entire network is differentiable, enabling end-to-end training using backpropagation. This allows the network to learn and optimize the planning process based on the given objectives and data. Exemplary pseudocode demonstrating some of the core components of a GNN-based DPN using PyTorch may be found in APPENDIX C. Other techniques such as deep learning combined with Monte Carlo tree search, HTN or ML-enhanced HTN, or baskets of such methods can be combined by system to explore various scenarios whose discrete state calculations and state transitions can be discretely represented and stored for further analysis or evaluation or training. Since system state information may be leveraged in the search for causal links in various state transitions and state conditions, the collaborative nature of such scenario explorations and perturbation methods can reduce the likelihood of being trapped in local minima or maxima and support conditions of more efficient or effective search via injected randomness in seed conditions and perturbation sequences. System may optionally engage in deeper analysis of particular state transitions or states of interest, both good or bad) to better understand them-which may suggest specific analysis or simulation modeling or expert lines of inquiry for further exploration.

Exemplary Computing Environment

Figure 13:
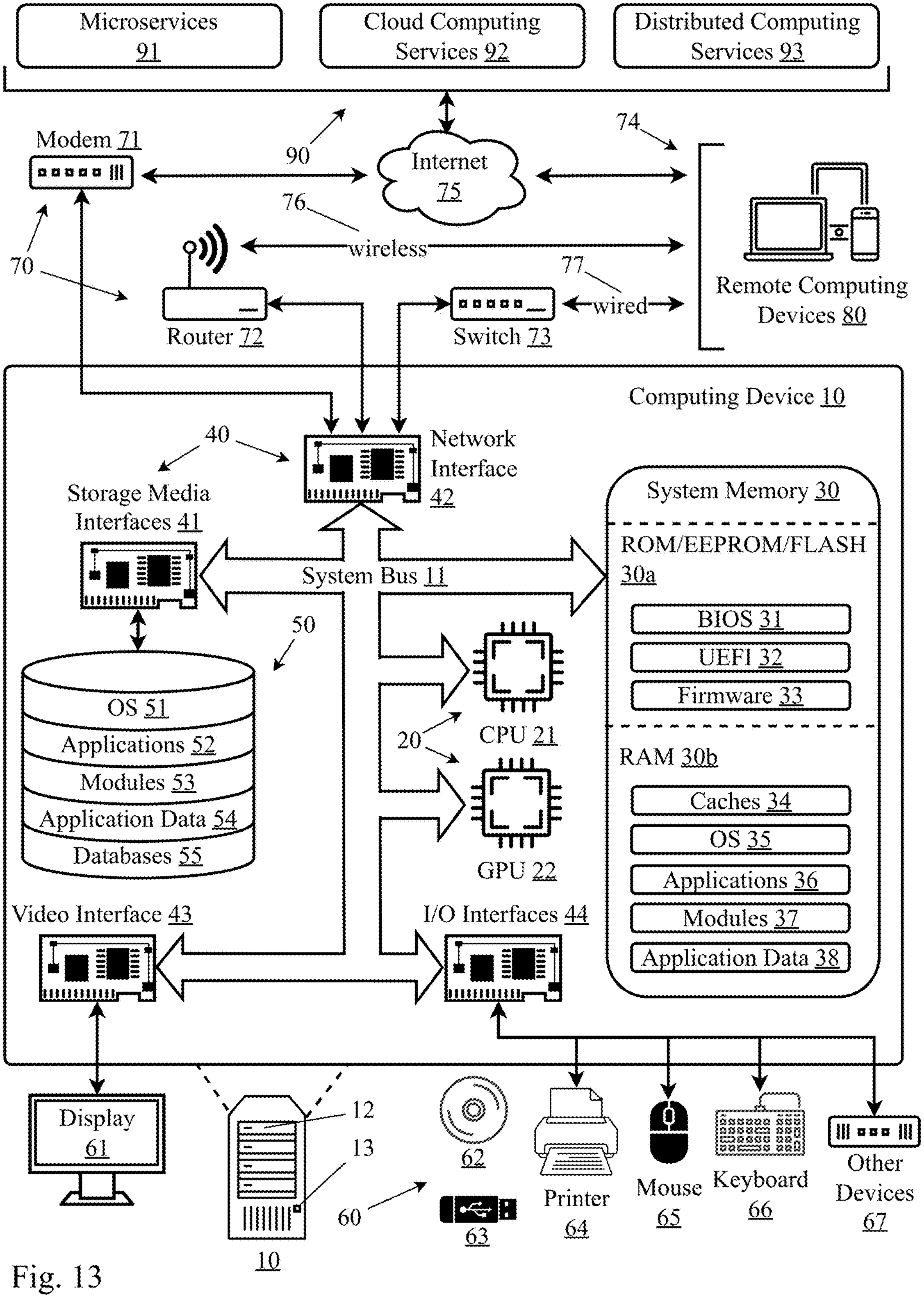
FIG. 13 illustrates an exemplary computing environment on which an embodiment described herein may be implemented, in full or in part.

FIG. 13 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Computing device 10 may be configured as a reduced instruction set computer (RISC) or a complex instruction set computer (CISC), depending upon the embodiment. Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NOSQL databases, and graph databases.

Applications (also known as computer software or software applications) are sets of programming instructions designed to perform specific tasks or provide specific functionality on a computer or other computing devices. Applications are typically written in high-level programming languages such as C, C++, Erlang, GoLang, Scala, Java, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

APPENDIX A: EXEMPLARY PSEUDOCODE FOR A VALUE ITERATION NETWORK

```
```python
import torch
import torch.nn as nn
class VIN(nn.Module):
  def __init__(self, num_actions, num_iterations):
    super(VIN, self).__init__( )
    self.num_actions = num_actions
    self.num_iterations = num_iterations
    self.reward_encoder = nn.Conv2d(1, 32, kernel_size=3, padding=1)
    self.value_encoder = nn.Conv2d(32, 1, kernel_size=1)
    self.policy_encoder = nn.Conv2d(32, num_actions, kernel_size=1)
  def forward(self, reward_map):
    x = self.reward_encoder(reward_map)
    value_map = self.value_encoder(x)
    for _ in range(self.num_iterations):
      value_map = self.value_iteration(x, value_map)
    policy_map = self.policy_encoder(x)
    return value_map, policy_map
  def value_iteration(self, x, value_map):
    # Perform value iteration update
    value_map_expanded = value_map.repeat(1, self.num_actions, 1, 1)
    q_values = self.policy_encoder(x) + value_map_expanded
    value_map, _ = torch.max(q_values, dim=1, keepdim=True)
    return value_map
```python
import torch
import torch.nn as nn
class DPN(nn.Module);
  def __init__(self, num_actions, planning_horizon):
    super(DPN, self).__init__( )
    self.num_actions = num_actions
    self.planning_horizon = planning_horizon
    self.state_encoder = nn.Sequential(
      nn.Conv2d(3, 32, kernel_size=3, padding=1),
      nn.ReLU( ),
      nn.Conv2d(32, 64, kernel_size=3, padding=1),
      nn.ReLU( )
    )
    self.action_encoder = nn.Linear(num_actions, 64)
    self.planner = nn.LSTM(128, 128, num_layers=1)
    self.decoder = nn.Linear(128, num_actions)
  def forward(self, state, actions):
    state_features = self.state_encoder(state)
    action_features = self.action_encoder(actions)
    features = torch.cat((state_features, action_features), dim=1)
    hidden = (torch.zeros(1, 1, 128), torch.zeros(1, 1, 128))
    for _ in range(self.planning_horizon);
      output, hidden = self.planner(features.unsqueeze(0), hidden)
    planned_actions = self.decoder(output.squeeze(0))
    return planned_actions
```
```python
import torch
import torch.nn as nn
import torch.nn.functional as F
class GNNLayer(nn.Module):
  def __init__(self, in_features, out_features):
    super(GNNLayer, self).__init__( )
    self.fc = nn.Linear(in_features, out_features)
  def forward(self, x, adj):
    x = self.fc(x)
    x = torch.matmul(adj, x)
    return F.relu(x)
class AttentionLayer(nn.Module):
  def __init__(self, in_features, out_features):
    super(AttentionLayer, self).__init__( )
    self.query = nn.Linear(in_features, out_features)
    self.key = nn.Linear(in_features, out_features)
    self.value = nn.Linear(in_features, out_features)
  def forward(self, x):
    q = self.query(x)
    k = self.key(x)
    v = self.value(x)
    scores = torch.matmul(q, k.transpose(-2, -1)) / (k.size(-1) ** 0.5)
    scores = F.softmax(scores, dim=-1)
    output = torch.matmul(scores, v)
```

-continued

```
  return output
class GNNDPNWithAttention(nn.Module):
 def __init__(self, in_features, hidden_features, out_features, num_layers):
  super(GNNDPNWithAttention, self).__init__( )
  self.gnn_layers = nn.ModuleList([GNNLayer(in_features, hidden_features)])
  self.gnn_layers.extend([GNNLayer(hidden_features, hidden_features) for _ in
range(num_layers - 1)])
  self.attention = AttentionLayer(hidden_features, hidden_features)
  self.fc = nn.Linear(hidden_features, out_features)
 def forward(self, x, adj):
  for layer in self.gnn_layers:
   x = layer(x, adj)
  x = self.attention(x)
  x = torch.sum(x, dim=1)
  x = self.fc(x)
  return x
```
```

What is claimed is:

**1**. A system for mobile energy and data planning and optimization, comprising: a computing device comprising at least a memory and a processor; a plurality of programming instructions that, when operating on the processor, cause the computing device to: collect a plurality of data from a plurality of sensors associated with the computing device or other systems, wherein the data includes one or more of objectives and objective functions, performance metrics and traces, observability data, sensor data, and system states associated with the computing device or the other systems, and wherein the plurality of data is populated into a knowledge vector graph, a vector graph, or a combination thereof; train an artificial intelligence model using the plurality of data from the knowledge vector graph, the vector graph, or the combination thereof to optimize efficiency of one or more of data, energy, and network being used or generated by the computing device; produce a plurality of recommendations using the artificial intelligence model, wherein the plurality of recommendations cause the computing device to optimize efficiency in achieving the one or more objectives and objective functions while utilizing energy and processing data; and modify a current state of the computing device into an updated state for future state progression or transition by implementing at least one of the plurality of recommendations produced by the artificial intelligence model.

**2**. The system of claim **1**, wherein the plurality of recommendations is broadcast to a user interface, and wherein a user makes elections through the user interface as to which recommendations to implement.

**3**. The system of claim **1**, wherein the plurality of data includes data gathered by integrated sensors within the computing device.

**4**. The system of claim **3**, wherein the plurality of data is preprocessed by an edge computer associated with the computing device before being sent to peer devices, other edge devices, content delivery networks or central cloud resources.

**5**. The system of claim **1**, wherein a user poses an inquiry to the system through a user interface and a response is generated by processing the inquiry through the knowledge vector graph, the vector graph, or the combination thereof, and the artificial intelligence model.

**6**. The system of claim **1**, wherein the data further includes one or more of chemical data, weather data, geospatial data, and energy data.

**7**. A method for mobile energy and data planning and optimization in a computing device, comprising the steps of: collecting a plurality of data from a plurality of sensors associated with the computing device or other systems, wherein the data includes one or more of objectives and objective functions, performance metrics and traces, observability data, sensor data, and system states associated with the computing device or the other systems, and wherein the plurality of data is populated into a knowledge vector graph, a vector graph, or a combination thereof; training an artificial intelligence model using the plurality of data from the knowledge vector graph, the vector graph, or the combination thereof to optimize efficiency of one or more of data, energy, and network being used or generated by the computing device; producing a plurality of recommendations using the artificial intelligence model, wherein the plurality of recommendations cause the computing device to optimize efficiency in achieving the one or more objectives and objective functions while utilizing energy and processing data; and modifying a current state of the computing device into an updated state for future state progression or transition by implementing at least one of the plurality of recommendations produced by the artificial intelligence model.

**8**. The method of claim **7**, wherein the plurality of recommendations is broadcast to a user interface, and wherein a user makes elections through the user interface as to which recommendations to implement.

**9**. The method of claim **7**, wherein the plurality of data includes data gathered by integrated sensors within the computing device.

**10**. The method of claim **9**, wherein the plurality of data is preprocessed by an edge computer associated with the computing device before being sent to peer devices, other edge devices, content delivery networks or central cloud resources.

**11**. The method of claim **7**, further comprising a user posing an inquiry through a user interface and generating a response by processing the inquiry through the knowledge vector graph, the vector graph, or the combination thereof and the artificial intelligence.

**12**. The method of claim **7**, wherein the data further includes one or more of chemical data, weather data, geospatial data, and energy data.

**13**. Non-transitory, computer-readable storage media having computer-executable instructions embodied thereon that, when executed by one or more processors of a computing system for mobile energy and data planning and optimization in a computing device, cause the computing system to: collect a plurality of data from a plurality of sensors associated with the computing device or other systems, wherein the data includes one or more of objectives and objective functions, performance metrics and traces, observability
```

data, sensor data, and system states associated with the computing device or the other systems, and wherein the plurality of data is populated into a knowledge vector graph, a vector graph, or a combination thereof; train an artificial intelligence model using the plurality of data from the knowledge vector graph, the vector graph, or the combination thereof to optimize efficiency of one or more of data, energy, and network being used or generated by the computing device; produce a plurality of recommendations using the artificial intelligence model, wherein the plurality of recommendations cause the computing device to optimize efficiency in achieving the one or more objectives and objective functions while utilizing energy and processing data; and modify a current state of the computing device into an updated state for future state progression or transition by implementing at least one of the plurality of recommendations produced by the artificial intelligence model.

14. The media of claim 13, wherein the plurality of recommendations is broadcast to a user interface, and wherein a user makes elections through the user interface as to which recommendations to implement.

15. The media of claim 13, wherein the plurality of data includes data gathered by integrated sensors within the computing device.

16. The media of claim 15, wherein the plurality of data is preprocessed by an edge computer associated with the computing device before being sent to peer devices, other edge devices, content delivery networks or central cloud resources.

17. The media of claim 13, wherein a user poses an inquiry through a user interface and a response is generated by processing the inquiry through the knowledge vector graph, the vector graph, or the combination thereof and the artificial intelligence.

18. The media of claim 13, wherein the data further includes one or more of chemical data, weather data, geospatial data, and energy data.

19. A system for mobile energy and data planning and optimization in a computing device, comprising one or more computers with executable instructions that, when executed, cause the system to: collect a plurality of data from a plurality of sensors or systems associated with the computing device or other systems, wherein the data includes one or more of objectives and objective functions, performance metrics and traces, observability data, sensor data, and system states associated with the computing device or the other systems, and wherein the plurality of data is populated into a knowledge vector graph, a vector graph, or a combination thereof; train an artificial intelligence model using the plurality of data from the knowledge vector graph, the vector graph, or the combination thereof to optimize efficiency of one or more of data, energy, and network being used or generated by the computing device; produce a plurality of recommendations using the artificial intelligence model, wherein the plurality of recommendations cause the computing device to optimize efficiency in achieving the one or more objectives and objective functions while utilizing energy and processing data; and modify a current state of the computing device into an updated state for future state progression or transition by implementing at least one of the plurality of recommendations produced by the artificial intelligence model.

20. The system of claim 19, wherein the plurality of recommendations is broadcast to a user interface, and wherein a user makes elections through the user interface as to which recommendations to implement.

21. The system of claim 19, wherein the plurality of data includes data gathered by integrated sensors within the computing device.

22. The system of claim 21, wherein the plurality of data is preprocessed by an edge computer associated with the computing device before being sent to peer devices, other edge devices, content delivery networks or central cloud resources.

23. The system of claim 19, wherein a user poses an inquiry to the system through a user interface and a response is generated by processing the inquiry through the knowledge vector graph, the vector graph, or the combination thereof and the artificial intelligence model.

24. The system of claim 19, wherein the data further includes one or more of chemical data, weather data, geospatial data, and energy data.

* * * * *